US012752599B2

(12) United States Patent
Ijuin et al.

(10) Patent No.: US 12,752,599 B2
(45) Date of Patent: Oct. 6, 2026

(54) REFRIGERATION CYCLE DEVICE

(71) Applicant: DENSO CORPORATION, Kariya City (JP)

(72) Inventors: Yukihisa Ijuin, Kariya City (JP); Toru Okamura, Kariya City (JP); Naoya Makimoto, Kariya City (JP); Yoshio Hayashi, Kariya City (JP); Yoshiki Kato, Kariya City (JP); Hiroaki Kawano, Kariya City (JP); Yasuhiro Yokoo, Kariya City (JP); Junki Hirayama, Kariya City (JP); Naito Muto, Kariya City (JP); Kohei Noguchi, Kariya City (JP)

(73) Assignee: DENSO CORPORATION, Kariya-city (JP)

( * ) Notice: Subject to any disclaimer, the term of this patent is extended or adjusted under 35 U.S.C. 154(b) by 203 days.

(21) Appl. No.: 18/829,542

(22) Filed: Sep. 10, 2024

(65) Prior Publication Data

US 2024/0424864 A1 Dec. 26, 2024

Related U.S. Application Data

(63) Continuation of application No. PCT/JP2023/006847, filed on Feb. 24, 2023.

(30) Foreign Application Priority Data

Mar. 15, 2022 (JP) ................................ 2022-040193

(51) Int. Cl.
*B60H 1/00* (2006.01)
*B60H 1/32* (2006.01)
(Continued)

(52) U.S. Cl.
CPC ..... *B60H 1/00899* (2013.01); *B60H 1/00278* (2013.01); *B60H 1/00321* (2013.01);
(Continued)

(58) Field of Classification Search
CPC .. F25B 5/02; F25B 7/00; F25B 25/005; F25B 49/02; F25B 49/022; B60H 1/00278; B60H 1/00899; B60H 1/3228; B60H 1/32284
See application file for complete search history.

(56) References Cited

U.S. PATENT DOCUMENTS

| | | | | |
|---|---|---|---|---|
| 11,897,316 | B2 * | 2/2024 | Makimoto | B60H 1/00278 |
| 2019/0184790 | A1 * | 6/2019 | Miura | B60H 1/00278 |
| 2021/0221199 | A1 * | 7/2021 | Lee | B60H 1/3228 |

FOREIGN PATENT DOCUMENTS

| | | | |
|---|---|---|---|
| DE | 102016112089 | A1 | 1/2018 |
| JP | S63159133 | U | 10/1988 |

(Continued)

*Primary Examiner* — Jonathan Bradford
(74) *Attorney, Agent, or Firm* — Harness, Dickey & Pierce, P.L.C.

(57) ABSTRACT

A first refrigeration cycle includes a first compressor, a first radiator, an air-conditioning expansion valve, an air-conditioning evaporator, a first expansion valve, and a first evaporator. In the first refrigeration cycle, a first refrigerant evaporates in at least one of the air-conditioning evaporator or the first evaporator. A second refrigeration cycle includes a second compressor, a second radiator, a second expansion valve, and a second evaporator. A heat transfer portion switches a heat radiation destination from the first radiator to a second refrigerant in the second evaporator or outside air. In the air-conditioning evaporator, the first refrigerant absorbs heat from ventilation air blown into a space to be air conditioned as the first refrigerant evaporates. In the first evaporator, the first refrigerant absorbs heat from the outside air as the first refrigerant evaporates. In the second radiator,
(Continued)

the second radiator radiates heat from the second refrigerant to the ventilation air.

16 Claims, 15 Drawing Sheets

(51) Int. Cl.
*F25B 41/31* (2021.01)
*F25B 49/02* (2006.01)
*F25B 5/02* (2006.01)

(52) U.S. Cl.
CPC ......... *B60H 1/32284* (2019.05); *F25B 41/31* (2021.01); *F25B 49/022* (2013.01); *F25B 5/02* (2013.01); *F25B 2600/025* (2013.01)

(56) References Cited

FOREIGN PATENT DOCUMENTS

JP 2012229916 A 11/2012
JP 2014062700 A 4/2014

* cited by examiner

FIG. 12

| | FIRST COMPRESSOR | SECOND COMPRESSOR |
|---|---|---|
| HEATING EFFICIENCY | PRIORITY | |
| HEATING PERFORMANCE | | PRIORITY |
| COOLING PERFORMANCE | PRIORITY | |
| BATTERY COOLING PERFORMANCE | | PRIORITY |

REFRIGERATION CYCLE DEVICE

CROSS REFERENCE TO RELATED APPLICATION

The present application is a continuation application of International Patent Application No. PCT/JP2023/006847 filed on Feb. 24, 2023, which designated the U.S. and claims the benefit of priority from Japanese Patent Application No. 2022-040193 filed on Mar. 15, 2022. The entire disclosures of all of the above applications are incorporated herein by reference.

TECHNICAL FIELD

The present disclosure relates to a refrigeration cycle device including a plurality of refrigeration cycles.

BACKGROUND

A refrigeration air-conditioning device may include a plurality of refrigeration cycles each including a compressor with variable operating capacities, a heat source-side heat exchanger, a decompression device, and a load-side heat exchanger. In each of the plurality of refrigeration cycles, a refrigerant in the refrigeration cycle radiates heat to or absorbs heat from a heat source-side heat medium in the heat source-side heat exchanger. The flow path for the heat source-side heat medium is configured to flow through the heat source-side heat exchangers of the respective refrigeration cycles in series.

In each of the plurality of refrigeration cycles, the refrigerant in the refrigeration cycle cools or heats the load-side heat medium in the load-side heat exchanger. The flow path for the load-side heat medium is configured to flow through the load-side heat exchangers of the refrigeration cycles in series.

The control device of the refrigeration air-conditioning device controls the total value of the compressor operating capacities of the refrigeration cycles based on the temperature of the load-side heat medium, and controls the operating capacities of the compressors so that the average value of the compressor efficiency of each refrigeration cycle becomes maximum.

SUMMARY

A refrigeration cycle device according to an aspect of the present disclosure is configured to perform air conditioning for a space to be air conditioned. The refrigeration cycle device includes: a first refrigeration cycle which includes a first compressor, a first radiator, an air-conditioning expansion valve, an air-conditioning evaporator, a first expansion valve, and a first evaporator, and in which a first refrigerant circulates while evaporating in at least one of the air-conditioning evaporator or the first evaporator and radiating heat in the first radiator; a second refrigeration cycle which includes a second compressor, a second radiator, a second expansion valve, and a second evaporator, and in which a second refrigerant circulates while evaporating in the second evaporator and radiating heat in the second radiator; and a heat transfer portion configured to switch a heat radiation destination from the first radiator to the second refrigerant in the second evaporator or outside air. In the air-conditioning evaporator, as the first refrigerant evaporates, the first refrigerant absorbs heat from ventilation air to be blown into the space to be air conditioned. In the first evaporator, as the first refrigerant evaporates, the first refrigerant absorbs heat from outside air, and the second radiator is configured to radiate heat from the second refrigerant in the second radiator to the ventilation air.

According to another aspect of the present disclosure, a refrigeration cycle device includes: a first refrigeration cycle which includes a first compressor, a first radiator, a first expansion valve, and a first evaporator, and in which a first refrigerant circulates while evaporating in the first evaporator and radiating heat in the first radiator; a second refrigeration cycle which includes a second compressor, a second radiator, a second expansion valve, and a second evaporator, and in which a second refrigerant circulates while evaporating in the second evaporator and radiating heat in the second radiator; and a heat transfer portion configured to transfer heat released from the first refrigerant in the first radiator to the second refrigerant in the second evaporator. The first evaporator is configured to cause the first refrigerant to absorb heat from outside air as the first refrigerant evaporates.

BRIEF DESCRIPTION OF DRAWINGS

The above and other objects, features and advantages of the present disclosure will become more apparent from the following detailed description made with reference to the accompanying drawings. In the drawings:

FIG. 12 is a diagram showing which one of the first and second compressors is given priority to increase the rotational speed when the rotational speeds of both the first and second compressors are to be increased during the operation of both the first and second compressors in the first embodiment;

DESCRIPTION OF EMBODIMENTS

Figure 1:
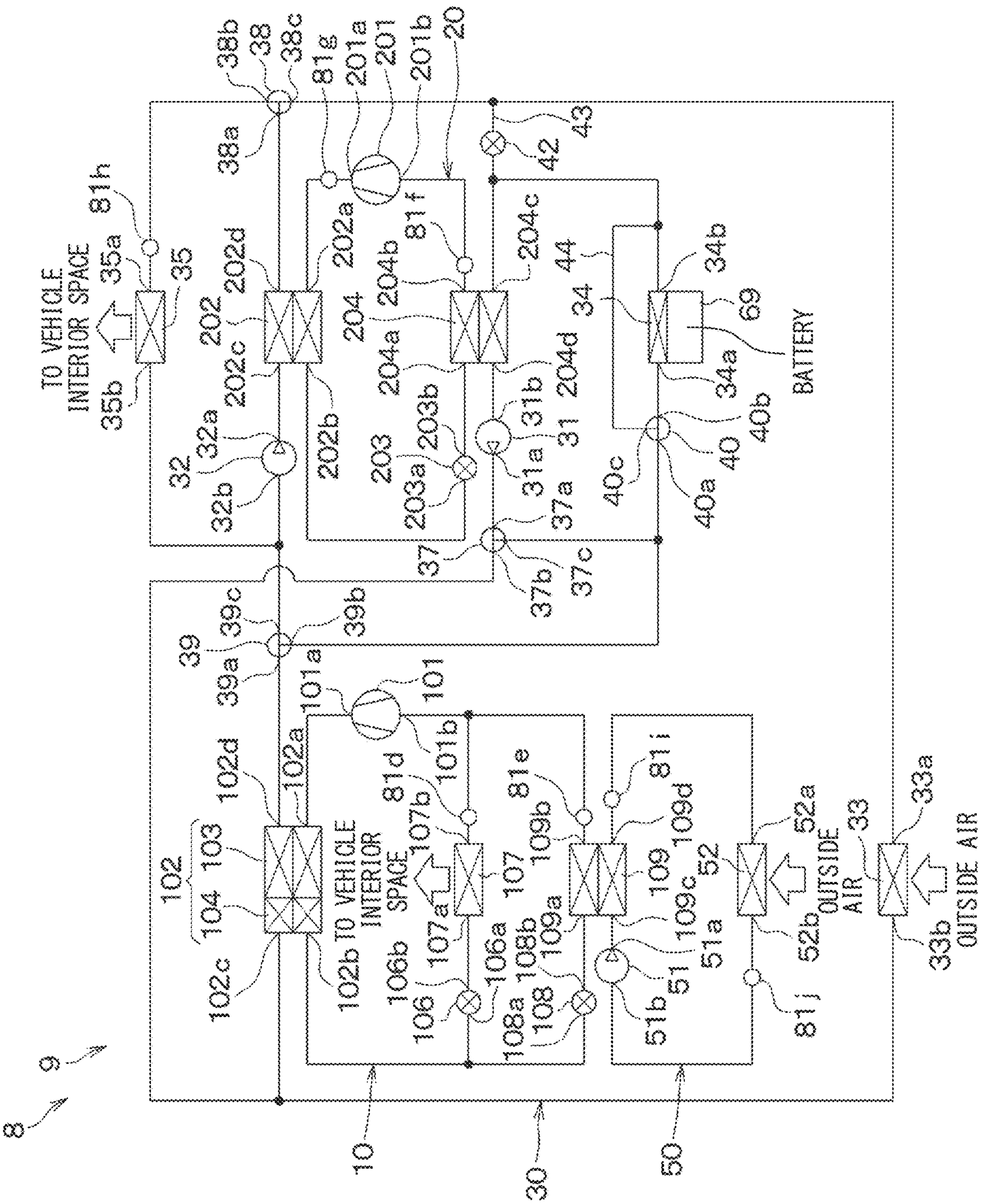
FIG. 1 is an overall configuration diagram showing a circuit configuration of a refrigeration cycle device included in an air conditioner according to a first embodiment.

For example, an air conditioning for a vehicle interior and a temperature control for a battery can be performed using a plurality of heat exchangers in a refrigeration cycle device. However, in recent years, vehicle heat sources have tended to be insufficient, and the demand, for increased capacity of batteries installed in vehicles and extended vehicle cruising distances, is rising year by year. Therefore, for example, it has become necessary to improve the efficiency of a refrigeration cycle used for air conditioning in the vehicle interior and temperature control for in-vehicle equipment.

In view of the above, an object of the present disclosure is to provide a refrigeration cycle device that can be operated with a high efficiency.

To achieve the above object, a refrigeration cycle device according to an aspect of the present disclosure is configured to perform air conditioning for a space to be air conditioned. The refrigeration cycle device includes a first refrigeration cycle, a second refrigeration cycle and a heat transfer portion. The first refrigeration cycle includes a first compressor, a first radiator, an air-conditioning expansion valve, an air-conditioning evaporator, a first expansion valve, and a first evaporator. In the first refrigeration cycle, a first refrigerant circulates while evaporating in at least one of the air-conditioning evaporator or the first evaporator and radiating heat in the first radiator. The second refrigeration cycle includes a second compressor, a second radiator, a second expansion valve, and a second evaporator. In the second refrigeration cycle, a second refrigerant circulates while evaporating in the second evaporator and radiating heat in the second radiator. The heat transfer portion is configured to switch a heat radiation destination from the first radiator to the second refrigerant in the second evaporator or outside air. In the air-conditioning evaporator, as the first refrigerant evaporates, the first refrigerant absorbs heat from ventilation air to be blown into the space to be air conditioned. In the first evaporator, as the first refrigerant evaporates, the first refrigerant absorbs heat from outside air, and the second radiator is configured to radiate heat from the second refrigerant in the second radiator to the ventilation air.

In this way, the first refrigeration cycle and the second refrigeration cycle are divided in roles. For example, the first refrigeration cycle can be configured for the purpose of cooling the space to be air conditioned, and the second refrigeration cycle can be configured for the purpose of heating the space to be air conditioned. During the heating of the space to be air conditioned, for example, the first refrigeration cycle and the second refrigeration cycle cooperate with each other to improve heating efficiency compared to a case where the refrigeration cycle device includes only a single refrigeration cycle. Accordingly, the efficiency of the refrigeration cycle device can be increased during both the cooling operation and heating operation of the space to be air conditioned.

According to another aspect of the present disclosure, a refrigeration cycle device includes a first refrigeration cycle, a second refrigeration cycle and a heat transfer portion. The first refrigeration cycle includes a first compressor, a first radiator, a first expansion valve, and a first evaporator. In the first refrigeration cycle, a first refrigerant circulates while evaporating in the first evaporator and radiating heat in the first radiator. The second refrigeration cycle includes a second compressor, a second radiator, a second expansion valve, and a second evaporator. In the second refrigeration cycle, a second refrigerant circulates while evaporating in the second evaporator and radiating heat in the second radiator. The heat transfer portion is configured to transfer heat released from the first refrigerant in the first radiator to the second refrigerant in the second evaporator. The first evaporator is configured to cause the first refrigerant to absorb heat from outside air as the first refrigerant evaporates.

In this way, the temperature and pressure of the second refrigerant on the low-temperature side of the second refrigeration cycle are increased by the first refrigeration cycle. Therefore, by causing the first refrigeration cycle and the second refrigeration cycle to cooperate with each other, it is possible to increase the efficiency of the refrigeration cycle device compared to, for example, a case where the refrigeration cycle device includes only a single refrigeration cycle, while obtaining a sufficient heat radiation amount from the second refrigerant in the second radiator.

Hereinafter, respective detail embodiments will be described with reference to the drawings. In the following embodiments, the same reference numerals are assigned to the same or equivalent portions in the drawings.

First Embodiment

Figure 2:
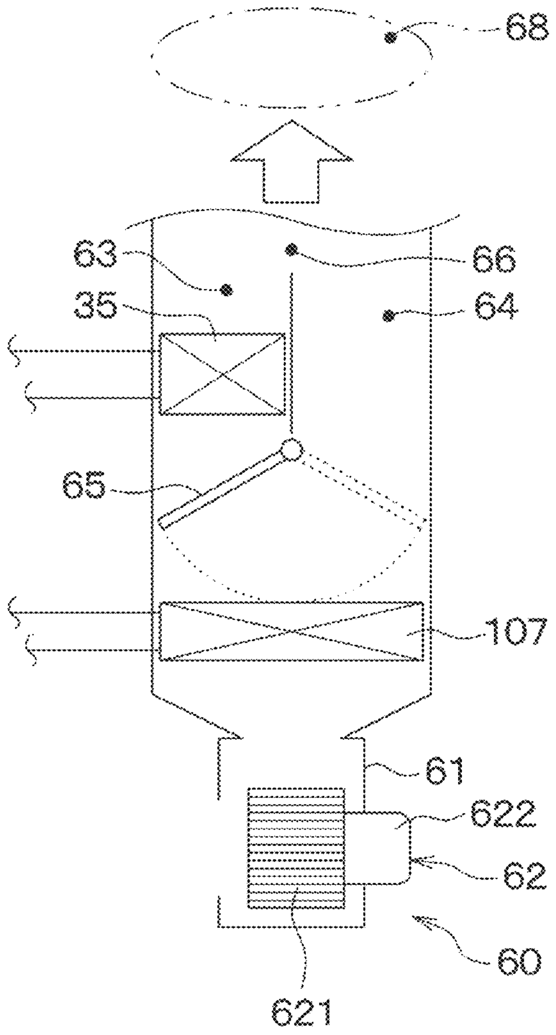
FIG. 2 is a schematic sectional view showing a schematic configuration of an interior air-conditioning unit included in the air conditioner, according to the first embodiment.

As illustrated in FIGS. 1 and 2, a refrigeration cycle device 9 of the present embodiment constitutes a part of an air conditioner 8 that adjusts a vehicle interior space 68 to an appropriate temperature. That is, the refrigeration cycle device 9 is a device for air-conditioning the vehicle interior space 68 that is a space to be air conditioned.

The air conditioner 8 includes the refrigeration cycle device 9 and an interior air-conditioning unit 60. The air conditioner 8 is installed in, for example, an electric vehicle or a hybrid vehicle. Hence, the vehicle in which the air conditioner 8 is installed includes a battery 69 that functions as a power source for a traveling motor. The battery 69 is a secondary battery that can be repeatedly charged and discharged, and is formed of a lithium-ion battery, for example. The temperature of the battery 69 is preferably maintained within a predetermined temperature range in order for the battery 69 to exhibit appropriate charge and discharge performance, and the battery 69 generates heat in association with its charge and discharge.

Therefore, the refrigeration cycle device 9 according to the present embodiment has a function of cooling the battery 69 and a function of warming the battery 69 in addition to a function of heating or cooling the ventilation air blown into the vehicle interior space 68. That is, the battery 69 is in-vehicle target equipment with its temperature controlled by the refrigeration cycle device 9.

The refrigeration cycle device 9 includes a first refrigeration cycle 10, a second refrigeration cycle 20, a first heat medium circuit 30, a second heat medium circuit 50, and a circuit controller 80*a* included in a control device 80 (cf. FIG. 3) that controls each piece of equipment of the air conditioner 8. The circuit controller 80*a* is a controller that controls control target equipment included in the refrigeration cycle device 9 among a plurality of pieces of equipment to be controlled by the control device 80. That is, the circuit controller 80*a* controls control target equipment included in each of the first refrigeration cycle 10, the second refrigeration cycle 20, the first heat medium circuit 30, and the second heat medium circuit 50. The circuit controller 80*a* corresponds to the controller of the present disclosure.

Each of the first refrigeration cycle 10 and the second refrigeration cycle 20 is formed of a vapor compression refrigeration cycle. Each of the first refrigeration cycle 10 and the second refrigeration cycle 20 is operated in a subcritical cycle in which the refrigerant pressure on the high-pressure side in the cycle does not exceed the critical pressure of the refrigerant.

The first refrigeration cycle 10 is a refrigerant circuit in which the first refrigerant circulates, and the first refrigerant is sealed in the refrigerant circuit as the first refrigeration cycle 10. As the first refrigerant that circulates in the first refrigeration cycle 10, various refrigerants can be adopted, but in the present embodiment, for example, a fluorocarbon refrigerant such as an HFO134a is adopted.

The first refrigeration cycle 10 includes a first compressor 101, a first radiator 102, an air-conditioning expansion valve 106, an air-conditioning evaporator 107, a first expansion valve 108, a first evaporator 109, pipes connecting these components, and the like.

In the first refrigeration cycle 10, a discharge port 101*a* of the first compressor 101 is connected to a refrigerant inlet 102*a* of the first radiator 102, and a refrigerant outlet 102*b* of the first radiator 102 is connected to a refrigerant inlet 106*a* of the air-conditioning expansion valve 106 and a refrigerant inlet 108*a* of the first expansion valve 108. A refrigerant outlet 106*b* of the air-conditioning expansion valve 106 is connected to a refrigerant inlet 107*a* of the air-conditioning evaporator 107, and a refrigerant outlet 108*b* of the first expansion valve 108 is connected to a refrigerant inlet 109*a* of the first evaporator 109. A refrigerant outlet 107*b* of the air-conditioning evaporator 107 and a refrigerant outlet 109*b* of the first evaporator 109 are both connected to an inlet port 101*b* of the first compressor 101.

The first compressor 101 includes a discharge port 101*a* and the inlet port 101*b*, and compresses the first refrigerant sucked from the inlet port 101*b* and discharges the compressed first refrigerant from the discharge port 101*a*. Specifically, the first compressor 101 is an electric compressor, and includes a compression mechanism portion that compresses the first refrigerant introduced into the compression chamber, and an electric motor that rotationally drives the compression mechanism portion. The first compressor 101 of the present embodiment may have a fixed compressor capacity or may be a variable capacity type capable of increasing or decreasing the compressor capacity.

Figure 3:
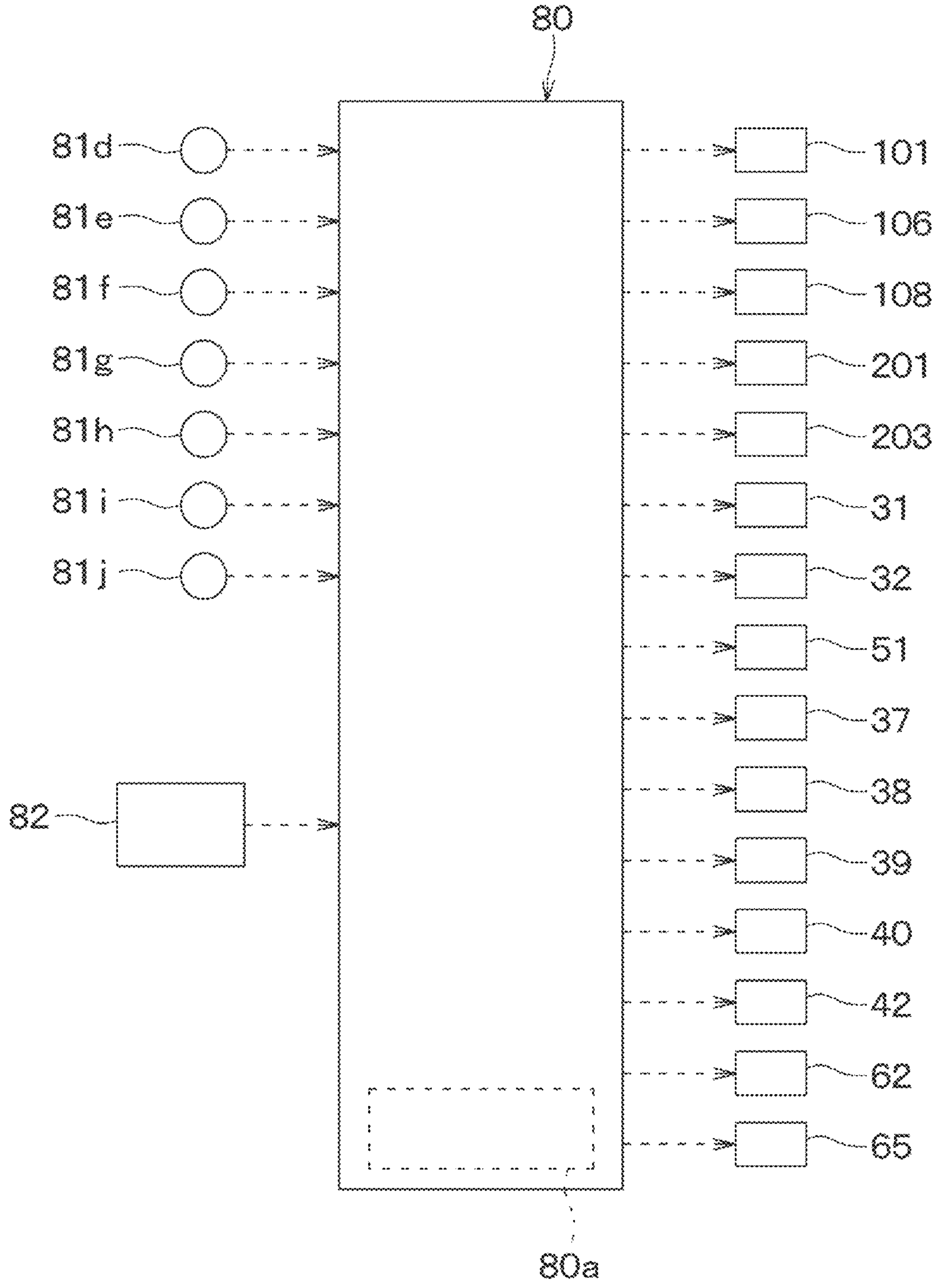
FIG. 3 is a block diagram showing an input/output system of a control device included in the air conditioner, according to the first embodiment.

The first compressor 101 is controlled by a control signal output from the circuit controller 80*a* in FIG. 3. For example, the rotational speed of the first compressor 101 (specifically, the rotational speed of the electric motor of the first compressor 101) is controlled by a control signal output from the circuit controller 80*a*. For example, the discharge flow rate of the first compressor 101 increases as the rotational speed of the first compressor 101 increases.

As illustrated in FIG. 1, the first radiator 102 includes a refrigerant inlet 102*a* into which the first refrigerant flows, the refrigerant outlet 102*b* from which the first refrigerant flows out, a heat medium inlet 102*c* into which the first heat medium of the first heat medium circuit 30 flows, and a heat medium outlet 102*d* from which the first heat medium flows out. The high-temperature and high-pressure first refrigerant discharged from the first compressor 101 flows into the refrigerant inlet 102*a* of the first radiator 102.

The first radiator 102 is a heat exchanger (i.e., a water-cooled capacitor) that exchanges heat between the first refrigerant and the first heat medium in the first heat medium circuit 30. The first radiator 102 radiates heat from the first refrigerant that has flowed into the refrigerant inlet 102*a* to the first heat medium, allows the first refrigerant after the heat radiation to flow out from the refrigerant outlet 102*b*, and allows the first heat medium heated by the first refrigerant to flow out from the heat medium outlet 102*d*.

Specifically, the first radiator 102 includes a condensing portion 103, a liquid receiving portion (not illustrated), and a subcooling portion 104. The condensing portion 103 is provided with the refrigerant inlet 102*a* and the heat medium outlet 102*d* of the first radiator 102, and the subcooling portion 104 is provided with the refrigerant outlet 102*b* and the heat medium inlet 102*c* of the first radiator 102.

The condensing portion 103 radiates heat from the first refrigerant that has flowed in from the refrigerant inlet 102*a* to the first heat medium of the first heat medium circuit 30, thereby heating the first heat medium and condensing the first refrigerant. The liquid receiving portion of the first radiator 102 separates the first refrigerant that has passed through the condensing portion 103 into gas and liquid, and stores the separated first refrigerant in the liquid phase as an excess refrigerant in the cycle.

The subcooling portion 104 of the first radiator 102 further radiates heat from the first refrigerant condensed by the condensing portion 103 to the first heat medium, thereby subcooling the first refrigerant. Specifically, the subcooling portion 104 subcools the first refrigerant in the liquid phase stored in the liquid receiving portion by causing the first refrigerant to radiate heat to the first heat medium before flowing into the condensing portion 103 (i.e., the first heat medium before heat exchange in the condensing portion 103). The first refrigerant subcooled in the subcooling portion 104 flows out from the refrigerant outlet 102*b* of the first radiator 102 and flows to the air-conditioning expansion valve 106 and the first expansion valve 108.

The air-conditioning expansion valve 106 includes a refrigerant inlet 106*a* through which the first refrigerant flows and a refrigerant outlet 106*b* through which the first refrigerant flows. The air-conditioning expansion valve 106 is a decompression device that decompresses the first refrigerant that has flowed into the refrigerant inlet 106*a* of the air-conditioning expansion valve 106. The air-conditioning expansion valve 106 is an electric expansion valve, and includes a valve body and an electric actuator. The electric actuator of the air-conditioning expansion valve 106 includes, for example, a stepping motor, and changes the throttle opening of the air-conditioning expansion valve 106 by displacing the valve body. Since the electric actuator of the air-conditioning expansion valve 106 is controlled by a control signal from the circuit controller 80*a* (cf. FIG. 3), the throttle opening of the air-conditioning expansion valve 106 is increased or decreased according to the control signal from the circuit controller 80*a*.

The air-conditioning expansion valve 106 is configured to reduce the throttle opening to zero, that is, configured to be fully closable. When the air-conditioning expansion valve 106 is fully closed, the flow of the first refrigerant from the first radiator 102 to the air-conditioning evaporator 107 is blocked. When the air-conditioning expansion valve 106 is open, the first refrigerant decompressed by the air-conditioning expansion valve 106 flows out from the refrigerant outlet 106*b* of the air-conditioning expansion valve 106 and flows to the refrigerant inlet 107*a* of the air-conditioning evaporator 107.

As illustrated in FIGS. 1 and 2, the air-conditioning evaporator 107 includes a refrigerant inlet 107*a* through which the first refrigerant flows and a refrigerant outlet 107*b* through which the first refrigerant flows. The air-conditioning evaporator 107 is a cooling heat exchanger that cools the ventilation air blown into the vehicle interior space 68, and is disposed in a casing 61 of the interior air-conditioning unit 60.

Specifically, the air-conditioning evaporator 107 exchanges heat between the first refrigerant that has flowed into the refrigerant inlet 107*a* and the ventilation air passing through the air-conditioning evaporator 107, causing the first refrigerant to evaporate and cooling the ventilation air through the heat exchange. That is, in the air-conditioning evaporator 107, the first refrigerant absorbs heat from the ventilation air as the first refrigerant evaporates. The first refrigerant that has absorbed heat in the air-conditioning evaporator 107 flows out from the refrigerant outlet 107*b* and flows to the inlet port 101*b* of the first compressor 101.

As illustrated in FIG. 1, the first expansion valve 108 includes a refrigerant inlet 108*a* into which the first refrigerant flows and a refrigerant outlet 108*b* from which the first refrigerant flows out. The first expansion valve 108 decompresses the first refrigerant that has flowed into the refrigerant inlet 108*a* of the first expansion valve 108, and allows the decompressed first refrigerant to flow out from the refrigerant outlet 108*b*. The first refrigerant that has flowed out from the refrigerant outlet 108*b* of the first expansion valve 108 flows into the refrigerant inlet 109*a* of the first evaporator 109.

The first expansion valve 108 is disposed at a position different from the air-conditioning expansion valve 106, but has a configuration similar to that of the air-conditioning expansion valve 106. That is, the first expansion valve 108 includes a valve body and an electric actuator, and the throttle opening of the first expansion valve 108 is increased or decreased according to a control signal from the circuit controller 80*a* (cf. FIG. 3). The first expansion valve 108 is configured to be fully closable.

When the first expansion valve 108 is fully closed, the flow of the first refrigerant from the first radiator 102 to the first evaporator 109 is blocked. When the first expansion valve 108 is open, the first refrigerant decompressed by the first expansion valve 108 flows out from the refrigerant outlet 108*b* of the first expansion valve 108 and flows to the refrigerant inlet 109*a* of the first evaporator 109.

Since the first expansion valve 108 and the air-conditioning expansion valve 106 are configured to be fully closable as described above, the first expansion valve and the air-conditioning expansion valve each have a function as a refrigerant flow path switching portion that selectively switches the flow path for the first refrigerant among, for example, a first flow state, a second flow state, and a third flow state. In the first flow state, the flow of the first refrigerant from the first radiator 102 to the air-conditioning evaporator 107 via the air-conditioning expansion valve 106 is blocked, and the flow of the first refrigerant from the first radiator 102 to the first evaporator 109 via the first expansion valve 108 is permitted. In the second flow state, the flow of the first refrigerant from the first radiator 102 to the air-conditioning evaporator 107 via the air-conditioning expansion valve 106 is permitted, and the flow of the first refrigerant from the first radiator 102 to the first evaporator 109 via the first expansion valve 108 is blocked. In the third flow state, both the flow of the first refrigerant from the first radiator 102 to the air-conditioning evaporator 107 via the air-conditioning expansion valve 106 and the flow of the first refrigerant from the first radiator 102 to the first evaporator 109 via the first expansion valve 108 are permitted.

The first evaporator 109 includes the refrigerant inlet 109*a* into which the first refrigerant flows, the refrigerant outlet 109*b* from which the first refrigerant flows out, a heat medium inlet 109*c* into which the second heat medium of the second heat medium circuit 50 flows, and a heat medium outlet 109*d* from which the second heat medium flows out. The first evaporator 109 is a heat exchanger (i.e., a chiller) that exchanges heat between the first refrigerant and the second heat medium, causing the first refrigerant to absorb heat and evaporate while cooling the second heat medium through the heat exchange between the first refrigerant and the second heat medium. The first refrigerant that has absorbed heat in the first evaporator 109 flows out from the refrigerant outlet 109*b* and flows to the inlet port 101*b* of the first compressor 101. At the same time, the second heat medium cooled in the first evaporator 109 flows out from the heat medium outlet 109*d*.

With the configuration described above, in the first refrigeration cycle 10, when the first compressor 101 is in operation, and when the air-conditioning expansion valve 106 is open and the first expansion valve 108 is fully closed, the first refrigerant flows to the air-conditioning evaporator 107 but does not flow to the first evaporator 109. Conversely, when the air-conditioning expansion valve 106 is fully closed and the first expansion valve 108 is open, the first refrigerant does not flow to the air-conditioning evaporator 107 but flows to the first evaporator 109. When both the air-conditioning expansion valve 106 and the first expansion valve 108 are open, the first refrigerant flows to both the air-conditioning evaporator 107 and the first evaporator 109. As described above, in the first refrigeration cycle 10, the first refrigerant circulates, while evaporating in either one or both of the air-conditioning evaporator 107 and the first evaporator 109, and radiating heat in the first radiator 102.

The second refrigeration cycle 20 is a refrigerant circuit in which the second refrigerant circulates, and the second refrigerant is sealed in the refrigerant circuit as the second refrigeration cycle 20. The second refrigerant that circulates in the second refrigeration cycle 20 may be the same refrigerant as the first refrigerant in the first refrigeration cycle 10 or various refrigerants different from the first refrigerant. However, in the present embodiment, the same refrigerant as the first refrigerant in the first refrigeration cycle 10 is adopted as the second refrigerant.

The second refrigeration cycle 20 includes a second compressor 201, a second radiator 202, a second expansion valve 203, a second evaporator 204, pipes connecting these components, and the like.

In the second refrigeration cycle 20, a discharge port 201*a* of the second compressor 201 is connected to a refrigerant inlet 202*a* of the second radiator 202, and a refrigerant outlet 202*b* of the second radiator 202 is connected to a refrigerant inlet 203*a* of the second expansion valve 203. A refrigerant outlet 203*b* of the second expansion valve 203 is connected to a refrigerant inlet 204*a* of the second evaporator 204, and a refrigerant outlet 204*b* of the second evaporator 204 is connected to an inlet port 201*b* of the second compressor 201.

The second compressor 201 includes a discharge port 201*a* and an inlet port 201*b*, compresses the second refrigerant sucked from the inlet port 201*b*, and discharges the compressed second refrigerant from the discharge port 201*a*. The second compressor 201 is disposed at a position different from the first compressor 101, but is an electric compressor with a configuration similar to that of the first compressor 101. That is, the second compressor 201 includes a compression mechanism portion and an electric motor, and is controlled by a control signal from the circuit controller 80*a* (cf. FIG. 3). For example, the rotational speed of the second compressor 201 is controlled by a control signal from the circuit controller 80*a*. For example, the discharge flow rate of the second compressor 201 increases as the rotational speed of the second compressor 201 increases.

Similarly to the first compressor 101, the second compressor 201 of the present embodiment may have a fixed compressor capacity or may be a variable capacity type capable of increasing or decreasing the compressor capacity. For example, in the present embodiment, as the first and second compressors 101, 201, those having the same compressor capacity are adopted when the compressor capacity is fixed, and those having the same maximum compressor capacity are adopted when the compressor capacity is variable.

The second radiator 202 includes the refrigerant inlet 202*a* into which the second refrigerant flows, the refrigerant outlet 202*b* from which the second refrigerant flows out, a heat medium inlet 202*c* into which the first heat medium of the first heat medium circuit 30 flows, and a heat medium outlet 202*d* from which the first heat medium flows out. The second radiator 202 is a heat exchanger (i.e., the water-cooled capacitor) that exchanges heat between the second refrigerant and the first heat medium, causing the second refrigerant to radiate heat to the first heat medium through the heat exchange. The second radiator 202 condenses the second refrigerant and heats the first heat medium through the heat exchange between the second refrigerant and the first heat medium. The second refrigerant that has radiated heat in the second radiator 202 flows out from the refrigerant outlet 202*b* and flows to the refrigerant inlet 203*a* of the second expansion valve 203. At the same time, the first heat medium heated in the second radiator 202 flows out from the heat medium outlet 202*d*.

The second expansion valve 203 includes the refrigerant inlet 203*a* into which the second refrigerant flows and the refrigerant outlet 203*b* from which the second refrigerant flows out. The second expansion valve 203 decompresses the second refrigerant that has flowed into the refrigerant inlet 203*a* of the second expansion valve 203, and allows the decompressed second refrigerant to flow out from the refrigerant outlet 203*b*. The second refrigerant that has flowed out from the refrigerant outlet 203*b* of the second expansion valve 203 flows into the refrigerant inlet 204*a* of the second evaporator 204.

The second expansion valve 203 is disposed at a position different from the air-conditioning expansion valve 106, but has a configuration similar to that of the air-conditioning expansion valve 106. That is, the second expansion valve 203 includes a valve body and an electric actuator, and the throttle opening degree of the second expansion valve 203 is increased or decreased according to a control signal from the circuit controller 80*a* (cf. FIG. 3). The second expansion valve 203 may not be fully closed.

The second evaporator 204 includes the refrigerant inlet 204*a* into which the second refrigerant flows, the refrigerant outlet 204*b* from which the second refrigerant flows out, a heat medium inlet 204*c* into which the first heat medium of the first heat medium circuit 30 flows, and a heat medium outlet 204*d* from which the first heat medium flows out. The second evaporator 204 is disposed at a position different from the first evaporator 109, but has a configuration similar to that of the first evaporator 109.

That is, the second evaporator 204 is a heat exchanger (i.e., the chiller) that exchanges heat between the second refrigerant and the first heat medium. The second evaporator 204 causes the second refrigerant to absorb heat from the first heat medium to the second heat medium through the heat exchange between the second refrigerant and the first heat medium, thereby evaporating the second refrigerant and cooling the first heat medium.

The second refrigerant that has absorbed heat in the second evaporator 204 flows out from the refrigerant outlet 204*b* and flows to the inlet port 201*b* of the second compressor 201. At the same time, the first heat medium cooled in the second evaporator 204 flows out from the heat medium outlet 204*d*.

With the configuration described above, in the second refrigeration cycle 20, when the second compressor 201 is in operation, the second refrigerant circulates while evaporating in the second evaporator 204 and radiating heat in the second radiator 202.

The first heat medium circuit 30 is a heat medium circuit in which the first heat medium circulates. In the present embodiment, the first heat medium circuit 30 corresponds to the heat transfer portion of the present disclosure, and the first heat medium corresponds to the heat medium of the present disclosure. The first heat medium is, for example, a liquid. As the first heat medium, for example, an antifreeze solution such as a solution containing ethylene glycol can be adopted.

The first heat medium circuit 30 includes a first pump 31, a second pump 32, a first outside air heat exchanger 33, an equipment heat exchanger 34, a heater core 35, a first switching valve 37, a second switching valve 38, a third switching valve 39, a bypass switching valve 40, a shut valve 42, an opening/closing passage 43, a bypass passage 44, pipes connecting these components, and the like.

In the first heat medium circuit 30, a discharge port 31*a* of the first pump 31 is connected to a first port 37*a* of the first switching valve 37. A second port 37*b* of the first switching valve 37 is connected to the heat medium inlet 102*c* of the first radiator 102, and a third port 37*c* of the first switching valve 37 is connected to a first port 40*a* of the bypass switching valve 40.

The heat medium outlet 102*d* of the first radiator 102 is connected to a first port 39*a* of the third switching valve 39, and a second port 39*b* of the third switching valve 39 is connected to the first port 40*a* of the bypass switching valve

40. A third port 39*c* of the third switching valve 39 is connected to an inlet port 32*b* of the second pump 32, and a second port 40*b* of the bypass switching valve 40 is connected to a heat medium inlet 34*a* of the equipment heat exchanger 34. A heat medium outlet 34*b* of the equipment heat exchanger 34 is connected to the heat medium inlet 204*c* of the second evaporator 204, and a third port 40*c* of the bypass switching valve 40 is connected to the heat medium outlet 34*b* of the equipment heat exchanger 34 via a bypass passage 44. The heat medium outlet 204*d* of the second evaporator 204 is connected to an inlet port 31*b* of the first pump 31.

A discharge port 32*a* of the second pump 32 is connected to the heat medium inlet 202*c* of the second radiator 202, and the heat medium outlet 202*d* of the second radiator 202 is connected to a first port 38*a* of the second switching valve 38. A second port 38*b* of the second switching valve 38 is connected to a heat medium inlet 35*a* of the heater core 35, and a heat medium outlet 35*b* of the heater core 35 is connected to the inlet port 32*b* of the second pump 32.

A third port 38*c* of the second switching valve 38 is connected to a first connection port 33*a* of the first outside air heat exchanger 33, and a second connection port 33*b* of the first outside air heat exchanger 33 is connected to the heat medium inlet 102*c* of the first radiator 102. The first connection port 33*a* of the first outside air heat exchanger 33 and the heat medium inlet 204*c* of the second evaporator 204 are connected to each other via the opening/closing passage 43.

The first pump 31 and the second pump 32 are electric pumps that pressure-feed the first heat medium, and the rotational speed of each of the first pump 31 and the second pump 32 is controlled according to a control signal output from the circuit controller 80*a* (cf. FIG. 3). The discharge flow rate of the first pump 31 increases as the rotational speed of the first pump 31 increases, and the discharge flow rate of the second pump 32 increases as the rotational speed of the second pump 32 increases.

The first pump 31 includes the discharge port 31*a* and the inlet port 31*b*, and discharges the first heat medium sucked from the inlet port 31*b* from the discharge port 31*a*. The second pump 32 includes a discharge port 32*a* and an inlet port 32*b*, and discharges the first heat medium sucked from the inlet port 32*b* from the discharge port 32*a*.

The first outside air heat exchanger 33 includes the first connection port 33*a* and the second connection port 33*b*. In the first outside air heat exchanger 33, the first heat medium flows into the first outside air heat exchanger 33 from one of the first connection port 33*a* or the second connection port 33*b*, and flows out of the first outside air heat exchanger 33 from the other.

The first outside air heat exchanger 33 is a heat exchanger that exchanges heat between the first heat medium and the outside air. The outside air is air outside the vehicle interior space 68. The first outside air heat exchanger 33 corresponds to the outside air heat exchanger of the present disclosure. The first outside air heat exchanger 33 is disposed on the front side of the vehicle to be exposed to outside air as traveling wind during the traveling of the vehicle, for example. The outside air is supplied to the first outside air heat exchanger 33 by the traveling of the vehicle or by operation of a blower (not illustrated).

The equipment heat exchanger 34 includes the heat medium inlet 34*a* into which the first heat medium flows and the heat medium outlet 34*b* from which the first heat medium flows out. The equipment heat exchanger 34 exchanges heat between the first heat medium that has flowed into the equipment heat exchanger 34 from the heat medium inlet 34*a* and the battery 69, thereby cooling or heating the battery 69. The first heat medium after heat exchange with the battery 69 flows out from the heat medium outlet 34*b*. For example, the equipment heat exchanger 34 is integrated with the battery 69 and is configured to cool or heat the battery 69 while equalizing the temperatures of a plurality of battery cells included in the battery 69.

As illustrated in FIGS. 1 and 2, the heater core 35 includes the heat medium inlet 35*a* into which the first heat medium flows and the heat medium outlet 35*b* from which the first heat medium flows out. The heater core 35 is a heating heat exchanger that exchanges heat between the first heat medium and ventilation air flowing through the casing 61 of the interior air conditioning unit 60 to heat the ventilation air, and is disposed in the casing 61 of the interior air conditioning unit 60. In the heater core 35, the first heat medium flows into the heater core 35 from the heat medium inlet 35*a* and exchanges heat with the ventilation air, and the first heat medium after the heat exchange flows out from the heat medium outlet 35*b*.

Each of the first switching valve 37, the second switching valve 38, the third switching valve 39, and the bypass switching valve 40 is an electric three-way valve. The operation of each of the switching valves 37, 38, 39, 40 is controlled by a control signal from the circuit controller 80*a* (cf. FIG. 3).

The first switching valve 37 includes the first port 37*a*, the second port 37*b*, and the third port 37*c*. The first switching valve 37 is switched between a first switching state, where the first port 37*a* communicates with the second port 37*b* and the third port 37*c* is fully closed, and a second switching state, where the first port 37*a* communicates with the third port 37*c* and the second port 37*b* is fully closed. The full closing of the port of the switching valve means that the port is closed and the flow of fluid (e.g., the first heat medium) is prevented at the port.

The second switching valve 38 includes the first port 38*a*, the second port 38*b*, and the third port 38*c*. The second switching valve 38 is switched between a first switching state, where the first port 38*a* communicates with the second port 38*b* and the third port 38*c* is fully closed, and a second switching state, where the first port 38*a* communicates with the third port 38*c* and the second port 38*b* is fully closed.

The third switching valve 39 includes the first port 39*a*, the second port 39*b*, and the third port 39*c*. The third switching valve 39 is switched between a first switching state, where the first port 39*a* communicates with the second port 39*b* and the third port 39*c* is fully closed, and a second switching state, where the first port 39*a* communicates with the third port 39*c* and the second port 39*b* is fully closed.

The bypass switching valve 40 includes a first port 40*a*, a second port 40*b*, and a third port 40*c*. The bypass switching valve 40 is switched among a temperature control switching state, a bypass switching state, and a first port closed state. When switched to the temperature control switching state, the bypass switching valve 40 causes the first port 40*a* and the second port 40*b* to communicate with each other and fully closes the third port 40*c*. When switched to the bypass switching state, the bypass switching valve 40 causes the first port 40*a* and the third port 40*c* to communicate with each other, and fully closes the second port 40*b*. When switched to the first port closed state, the bypass switching valve 40 causes the second port 40*b* and the third port 40*c* to communicate with each other, and fully closes the first port 40*a*.

For example, when the battery 69 is to be cooled or warmed, the bypass switching valve 40 is switched to the temperature control switching state by a control signal from the circuit controller 80*a*. Conversely, when the battery 69 is neither cooled nor warmed, and the first heat medium is to be allowed to flow by bypassing the equipment heat exchanger 34, the bypass switching valve 40 is switched to the bypass switching state by a control signal from the circuit controller 80*a*.

The shut valve 42 is an electric opening/closing valve, and the operation of the shut valve 42 is controlled by a control signal from the circuit controller 80*a* (cf. FIG. 3). The shut valve 42 is provided in the opening/closing passage 43, and opens and closes the opening/closing passage 43. When the shut valve 42 is opened, the opening/closing passage 43 is opened, and when the shut valve 42 is closed, the opening/closing passage 43 is closed.

For example, when the shut valve 42 closes the opening/closing passage 43, the communication between the first connection port 33*a* of the first outside air heat exchanger 33 and the heat medium inlet 204*c* of the second evaporator 204 is blocked. On the other hand, when the shut valve 42 opens the opening/closing passage 43, the first heat medium can flow between the first connection port 33*a* of the first outside air heat exchanger 33 and the heat medium inlet 204*c* of the second evaporator 204.

In the first heat medium circuit 30, the flow channel for the first heat medium (i.e., the flow path through which the first heat medium flows) is switched according to the operation of each of the shut valve 42 and the switching valves 37, 38, 39, 40. That is, each of the shut valve 42 and the switching valves 37, 38, 39, 40 functions as a flow channel switching portion that switches the flow channel for the first heat medium in the first heat medium circuit 30.

The second heat medium circuit 50 is a heat medium circuit in which the second heat medium circulates. The second heat medium may be the same heat medium as the first heat medium of the first heat medium circuit 30 or various heating media different from the first heat medium. However, in the present embodiment, the same heat medium as the first heat medium of the first heat medium circuit 30 is adopted as the second heat medium.

The second heat medium circuit 50 includes a third pump 51, a second outside air heat exchanger 52, pipes connecting these components, and the like.

In the second heat medium circuit 50, a discharge port 51*a* of the third pump 51 is connected to the heat medium inlet 109*c* of the first evaporator 109, and the heat medium outlet 109*d* of the first evaporator 109 is connected to a heat medium inlet 52*a* of the second outside air heat exchanger 52. A heat medium outlet 52*b* of the second outside air heat exchanger 52 is connected to an inlet port 51*b* of the third pump 51. Therefore, in the second heat medium circuit 50, when the third pump 51 operates, the second heat medium discharged from the discharge port 51*a* of the third pump 51 sequentially flows through the first evaporator 109 and the second outside air heat exchanger 52, and is then sucked into the inlet port 51*b* of the third pump 51.

The third pump 51 is an electric pump that pressure-feeds the second heat medium, and the rotational speed of the third pump 51 is controlled according to a control signal output from the circuit controller 80*a* (cf. FIG. 3). The discharge flow rate of the third pump 51 increases as the rotational speed of the third pump 51 increases. The third pump 51 includes the discharge port 51*a* and the inlet port 51*b*, and discharges the second heat medium sucked from the inlet port 51*b* from the discharge port 51*a*.

The second outside air heat exchanger 52 is a heat exchanger that exchanges heat between the second heat medium and the outside air, and includes the heat medium inlet 52*a* and the heat medium outlet 52*b*. The second outside air heat exchanger 52 exchanges heat between the second heat medium that has flowed from the first evaporator 109 into the heat medium inlet 52*a* and the outside air, allowing the second heat medium that has absorbed heat from the outside air to flow from the heat medium outlet 52*b* to the inlet port 51*b* of the third pump 51 through the heat exchange.

The second outside air heat exchanger 52 is disposed, for example, on the front side of the vehicle together with the first outside air heat exchanger 33 to be exposed to outside air as traveling wind during the traveling of the vehicle. The outside air is supplied to the second outside air heat exchanger 52 by the traveling of the vehicle or by operation of a blower (not illustrated).

The interior air conditioning unit 60 illustrated in FIG. 2 is a device for adjusting the ventilation air blown into the vehicle interior space 68 to an appropriate temperature. For example, the interior air conditioning unit 60 is disposed inside an instrument panel at the foremost of the vehicle interior space 68. The interior air conditioning unit 60 includes the casing 61, the air-conditioning evaporator 107, the heater core 35, the blower 62, and an air mix door 65.

The casing 61 is a passage-forming portion that forms an air flow path for the ventilation air blown into the vehicle interior space 68, and constitutes the outer shell of the interior air conditioning unit 60. The air-conditioning evaporator 107, the heater core 35, and the like are accommodated inside the casing 61. Although not illustrated, an inside/outside air box that adjusts the introduction ratio of inside air and outside air introduced into the casing 61 is disposed upstream in the air flow of the casing 61.

The blower 62 is an electric blower. The blower 62 includes a centrifugal fan 621 and an electric motor 622 that rotationally drives the centrifugal fan 621. The centrifugal fan 621 is disposed inside the casing 61. The centrifugal fan 621 rotates to suck air from the inside/outside air box and blow the sucked air toward the vehicle interior space 68. The rotational speed of the blower 62, specifically, the rotational speed of the electric motor 622 of the blower 62, is controlled by a control signal output from the control device 80 (cf. FIG. 3).

Inside the casing 61, the air-conditioning evaporator 107 is disposed in the air flow of the blower 62, downstream of the centrifugal fan 621. A warm air flow path 63 and a cold air flow path 64 are formed in parallel in the air flow, downstream of the air-conditioning evaporator 107. The heater core 35 is disposed in the warm air flow path 63. The cold air flow path 64 is a flow path for allowing the air that has passed through the air-conditioning evaporator 107 to flow by bypassing the heater core 35.

The air mix door 65 is disposed between the air-conditioning evaporator 107 and the heater core 35 inside the casing 61. The air mix door 65 is a door device that opens and closes the warm air flow path 63 and the cold air flow path 64, and adjusts an air volume ratio between air passing through the warm air flow path 63 and air passing through the cold air flow path 64. The operation of the air mix door 65 is controlled by a control signal output from the control device 80 (cf. FIG. 3).

Inside the casing 61, an air mix space 66 for mixing warm air that has passed through the warm air flow path 63 and cold air that has passed through the cold air flow path 64 is formed in the air flow, downstream of the warm air flow path 63 and the cold air flow path 64. Although not illustrated, a plurality of opening holes for blowing out the ventilation air adjusted to a desired temperature in the air mix space 66 to the vehicle interior space 68 are formed in the most downstream portion of the air flow inside the casing 61.

As illustrated in FIG. 3, the control device 80 is an electronic control device formed of a computer and its peripheral circuits, the computer including a semiconductor memory as a non-transitory tangible recording medium and a processor. The control device 80 executes a computer program stored in the semiconductor memory. By executing this computer program, a method corresponding to the computer program is executed. That is, the control device 80 executes various control processes according to the computer program. The same applies to the circuit controller 80*a* included in the control device 80.

For example, the control device 80 performs air conditioning, such as heating, cooling, and dehumidification and heating of the vehicle interior space 68, the temperature control for the battery 69, and the like. The dehumidification and heating of the vehicle interior space 68 is air conditioning in which the ventilation air flowing into the casing 61 of the interior air conditioning unit 60 is dehumidified and then heated. Specifically, the dehumidification and heating of the vehicle interior space 68 is air conditioning in which the ventilation air is cooled to a temperature lower than the dew point temperature by the air-conditioning evaporator 107 and then raised to a desired temperature in the heater core 35, and the heated air is blown into the vehicle interior space 68.

Various pieces of equipment including components of the refrigeration cycle device 9 are connected to the output side of the control device 80. Each piece of equipment connected to the output side of the control device 80 is control target equipment controlled by the control device 80. Specifically, the following are connected to the output side of the control device 80: the first compressor 101, the air-conditioning expansion valve 106, the first expansion valve 108, the second compressor 201, the second expansion valve 203, the first to third pumps 31, 32, 51, the switching valves 37, 38, 39, 40, the shut valve 42, the blower 62, the air mix door 65, and the like.

A plurality of sensors included in the refrigeration cycle device 9 are connected to the input side of the control device 80. Specifically, the following are connected to the input side of the control device 80: an inside air temperature sensor, an outside air temperature sensor, a solar sensor, a first temperature and pressure sensor 81*d*, a second temperature and pressure sensor 81*e*, a third temperature and pressure sensor 81*f*, a first temperature sensor 81*g*, a second temperature sensor 81*h*, a third temperature sensor 81*i*, a fourth temperature sensor 81*j*, and the like.

The first temperature and pressure sensor 81*d* detects the temperature and pressure of the first refrigerant at the refrigerant outlet 107*b* of the air-conditioning evaporator 107. Based on the detected temperature and pressure of the first refrigerant, the circuit controller 80*a* adjusts the throttle opening of the air-conditioning expansion valve 106, for example.

The second temperature and pressure sensor 81*e* detects the temperature and pressure of the first refrigerant at the refrigerant outlet 109*b* of the first evaporator 109. Based on the detected temperature and pressure of the first refrigerant, the circuit controller 80*a* adjusts the throttle opening of the first expansion valve 108, for example.

The third temperature and pressure sensor 81*f* detects the temperature and pressure of the second refrigerant at the refrigerant outlet 204*b* of the second evaporator 204. Based on the detected temperature and pressure of the second refrigerant, the circuit controller 80*a* adjusts the throttle opening of the second expansion valve 203, for example.

The first temperature sensor 81*g* detects the temperature of the second refrigerant at the discharge port 201*a* of the second compressor 201, and the second temperature sensor 81*h* detects the temperature of the first heat medium at the heat medium inlet 35*a* of the heater core 35. The third temperature sensor 81*i* detects the temperature of the second heat medium at the heat medium outlet 109*d* of the first evaporator 109, and the fourth temperature sensor 81*j* detects the temperature of the second heat medium at the heat medium outlet 52*b* of the second outside air heat exchanger 52.

In this manner, various detection signals are input to the control device 80. This enables the refrigeration cycle device 9 and the interior air conditioning unit 60 to adjust the temperature and the like of the ventilation air blown into the vehicle interior space 68 according to the detection signal, thereby achieving comfortable air conditioning.

An operation panel 82 as an operation device used for various input operations by an occupant is connected to the input side of the control device 80. The operation panel 82 is disposed near the instrument panel and includes various operation switches operated by the occupant. Operation signals from various operation switches included in the operation panel 82 are input to the control device 80.

The various operation switches of the operation panel 82 include an automatic switch, an operation mode changeover switch, an air volume setting switch, a temperature setting switch, a blowing mode changeover switch, and the like.

When the vehicle interior space 68 is to be cooled, heated, or dehumidified and heated, the control device 80 causes the blower 62 to operate, blowing air toward the vehicle interior space 68. When the vehicle interior space 68 is to be cooled, the control device 80 controls the air mix door 65 to a door position where the warm air flow path 63 is fully closed and the cold air flow path 64 is fully opened in FIG. 2, for example. Thus, during the cooling of the vehicle interior space 68, the ventilation air that has flowed out from the air-conditioning evaporator 107 bypasses the heater core 35 and flows into the vehicle interior space 68.

On the other hand, when the vehicle interior space 68 is to be heated, or dehumidified and heated, the control device 80 controls the air mix door 65 to a door position where the warm air flow path 63 is fully opened and the cold air flow path 64 is fully closed, for example. Thus, during the heating or dehumidification and heating of the vehicle interior space 68, the ventilation air that has flowed out from the air-conditioning evaporator 107 passes through the heater core 35 and then flows into the vehicle interior space 68. In other words, in this case, the heater core 35 is disposed to heat the ventilation air that has flowed out from the air-conditioning evaporator 107.

The refrigeration cycle device 9 is configured to be able to appropriately switch the operation mode of the refrigeration cycle device 9. Specifically, the refrigeration cycle device 9 is configured to execute, as its operation modes, a coordinated heating mode, a single heating mode, a cooling mode, an equipment-cooling mode, an equipment-warming heating mode, an equipment-warming mode, an equipment-cooling heating mode, a first dehumidification and heating mode, and a second dehumidification and heating mode.

These plurality of operation modes are basically performed selectively, but the cooling mode and the equipment-cooling mode can be performed simultaneously. In the description of the present embodiment, an operation mode in which both the cooling mode and the equipment-cooling mode are performed may be referred to as an equipment-cooling cooling mode.

For example, the operation modes of the refrigeration cycle device 9 are switched by the circuit controller 80*a*, based on detection signals obtained from a plurality of sensors connected to the control device 80 and operation signals from the operation panel 82. Each operation mode of the refrigeration cycle device 9 will be described below.

<Coordinated Heating Mode>

Figure 4:
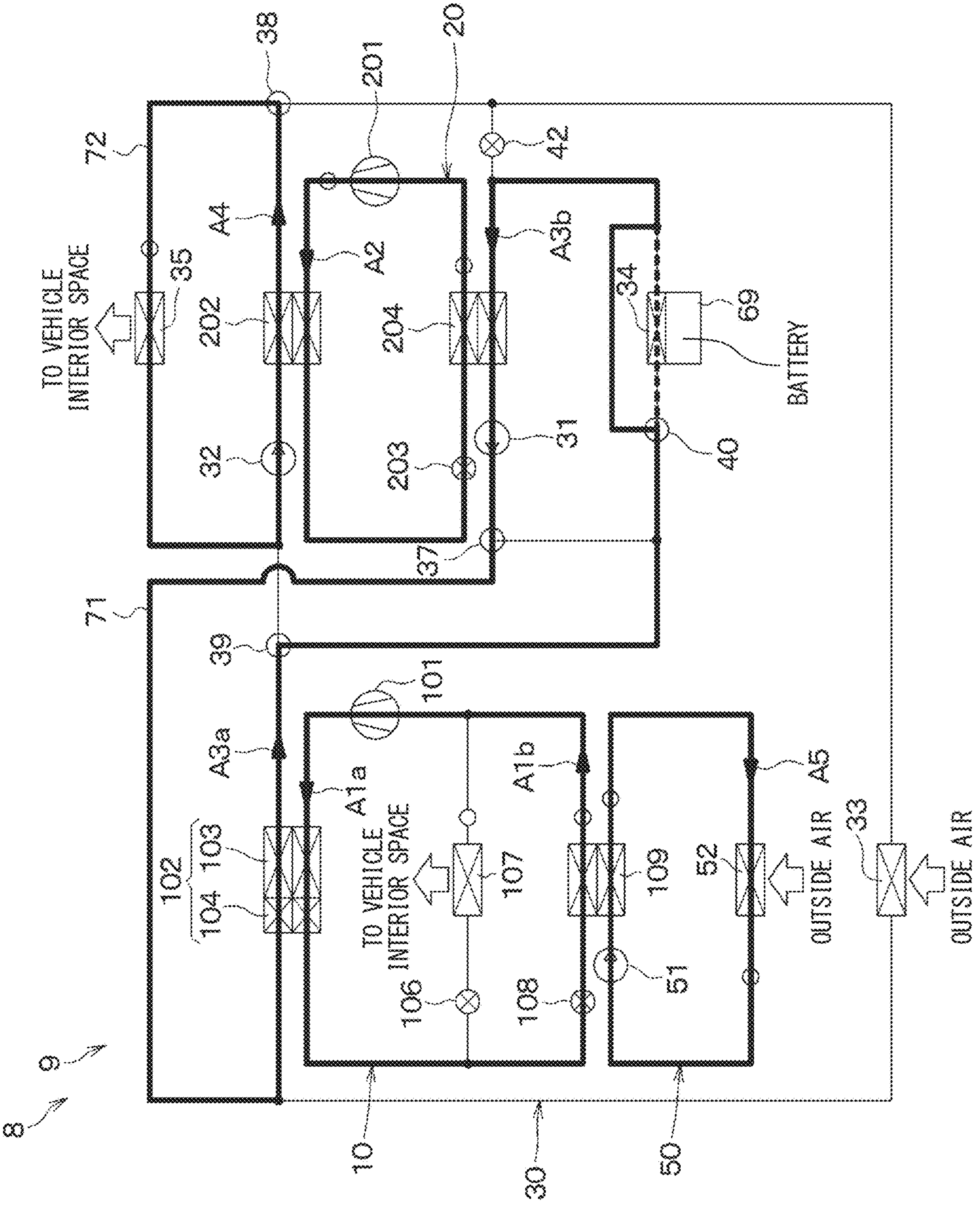
FIG. 4 is a diagram indicating a refrigerant flow and a the heat medium flow, when the refrigeration cycle device is operated in a coordinated heating mode, by thick lines in the overall configuration diagram of FIG. 1.

As illustrated in FIGS. 1 and 4, the coordinated heating mode of the refrigeration cycle device 9 is an operation mode that is performed during the heating of the vehicle interior space 68 and warms the ventilation air by the operation of both the first compressor 101 and the second compressor 201. In short, the coordinated heating mode is an operation mode for warming ventilation air with both the first and second refrigeration cycles 10, 20.

The coordinated heating mode and a single heating mode to be described later are operation modes that are selectively performed when the vehicle interior space 68 is to be heated. Switching between the coordinated heating mode and the single heating mode may be performed according to physical quantities detected by a plurality of sensors, or may be performed according to a manual operation of the occupant on the operation panel 82.

In the coordinated heating mode, the circuit controller 80*a* (cf. FIG. 3) controls each piece of control target equipment so that the first refrigerant, the second refrigerant, the first heat medium, and the second heat medium flow as indicated by arrows A1*a*, A1*b*, A2, A3*a*, A3*b*, A4, and A5 and thick solid lines in FIG. 4.

A plurality of thick solid lines and a thick broken line in FIG. 4 each indicate a flow channel for the first refrigerant, the second refrigerant, the first heat medium, or the second heat medium in circulation. The same applies to the drawings corresponding to FIG. 4, which will be described later.

Specifically, in the coordinated heating mode, the circuit controller 80*a* brings the first switching valve 37 into the first switching state, brings the second switching valve 38 into the first switching state, brings the third switching valve 39 into the first switching state, brings the bypass switching valve 40 into the bypass switching state, and brings the shut valve 42 into the closed state. Thereby, the circuit controller 80*a* establishes a first circulation path 71, through which the first heat medium circulates between the first radiator 102 and the second evaporator 204, and a second circulation path 72, through which the first heat medium circulates between the second radiator 202 and the heater core 35, in the first heat medium circuit 30. The first circulation path 71 and the second circulation path 72 are formed so that the first heat medium is prevented from flowing therebetween.

The circuit controller 80*a* causes the first pump 31 to operate and the first heat medium to thus circulate through the first circulation path 71 as indicated by arrows A3*a* and A3*b* in FIG. 4. Specifically, in the first circulation path 71, the first heat medium discharged from the discharge port 31*a* of the first pump 31 sequentially flows through the first switching valve 37, the subcooling portion 104 of the first radiator 102, the condensing portion 103 of the first radiator 102, the third switching valve 39, the bypass switching valve 40, and the second evaporator 204, and is then sucked into the inlet port 31*b* of the first pump 31.

Therefore, in the coordinated heating mode, the heat released from the first refrigerant in the first radiator 102 is transferred to the second refrigerant in the second evaporator 204 by the first heat medium circuit 30. That is, the heat radiation destination from the first radiator 102 via the first heat medium is the second refrigerant in the second evaporator 204.

In the coordinated heating mode, as described above, the circuit controller 80*a* basically brings the bypass switching valve 40 to the bypass switching state, but may bring the bypass switching valve 40 into the temperature control switching state. Therefore, in the coordinated heating mode, the first circulation path 71 may be a flow path that does not allow the first heat medium to flow through the equipment heat exchanger 34, or may be a flow path that allows the first heat medium to flow through the equipment heat exchanger 34. For example, when the temperature of the battery 69 is higher than that of the first heat medium flowing into the first port 40*a* of the bypass switching valve 40, the circuit controller 80*a* brings the bypass switching valve 40 into the temperature control switching state. In this way, the battery 69 can be cooled in the coordinated heating mode.

The circuit controller 80*a* causes the second pump 32 to operate and the first heat medium to thus circulate through the second circulation path 72 as indicated by arrow A4 in FIG. 4. Specifically, in the second circulation path 72, the first heat medium discharged from the discharge port 32*a* of the second pump 32 sequentially flows through the second radiator 202, the second switching valve 38, and the heater core 35, and is then sucked into the inlet port 32*b* of the second pump 32.

The circuit controller 80*a* causes the third pump 51 to operate and the second heat medium to thus circulate in the second heat medium circuit 50 as indicated by arrow A5 in FIG. 4.

While fully closing the air-conditioning expansion valve 106, the circuit controller 80*a* adjusts the throttle opening of the first expansion valve 108 so that the first expansion valve 108 exerts a decompressing action. The circuit controller 80*a* then causes the first compressor 101 to operate. Thus, in the first refrigeration cycle 10, the first refrigerant circulates as indicated by arrows A1*a* and A1*b* in FIG. 4. That is, the first refrigerant discharged from the discharge port 101*a* of the first compressor 101 sequentially flows through the condensing portion 103 of the first radiator 102, the subcooling portion 104 of the first radiator 102, the first expansion valve 108, and the first evaporator 109, and is then sucked into the inlet port 101*b* of the first compressor 101.

At this time, since the second heat medium circulates in the second heat medium circuit 50, in the first evaporator 109, as the first refrigerant evaporates, the first refrigerant absorbs heat from the outside air passing through the second outside air heat exchanger 52 via the second heat medium. Since the air-conditioning expansion valve 106 is fully closed, heat exchange is not performed between the first refrigerant and the ventilation air flowing through the casing 61 of the interior air conditioning unit 60 (cf. FIG. 2) in the air-conditioning evaporator 107, and the air-conditioning evaporator 107 does not cool the ventilation air.

The circuit controller 80*a* adjusts the throttle opening of the second expansion valve 203 so that the second expansion valve 203 exerts a decompressing action, causing the second compressor 201 to operate. Thus, in the second refrigeration cycle 20, the second refrigerant circulates as indicated by arrow A2 in FIG. 4. That is, the second refrigerant discharged from the discharge port 201*a* of the second compressor 201 sequentially flows through the second radiator 202, the second expansion valve 203, and the second evaporator 204, and is then sucked into the inlet port 201*b* of the second compressor 201.

At this time, since the first heat medium flows in the second circulation path 72, the second radiator 202 radiates heat from the second refrigerant flowing in the second radiator 202 to the ventilation air passing through the heater core 35 via the first heat medium.

As described above, in the coordinated heating mode, the first refrigerant, the second refrigerant, the first heat medium, and the second heat medium circulate, whereby heat is absorbed from the outside air passing through the second outside air heat exchanger 52 into the second heat medium of the second heat medium circuit 50. The heat absorbed from the outside air into the second heat medium is sequentially transferred from the second heat medium to the first refrigerant in the first refrigeration cycle 10, the first heat medium in the first circulation path 71, the second refrigerant in the second refrigeration cycle 20, and the first heat medium in the second circulation path 72, and is released from the first heat medium to the ventilation air in the heater core 35. This enables the air conditioner 8 to heat the ventilation air blown into the vehicle interior space 68, thus heating the vehicle interior space 68.

<Single Heating Mode>

Figure 5:
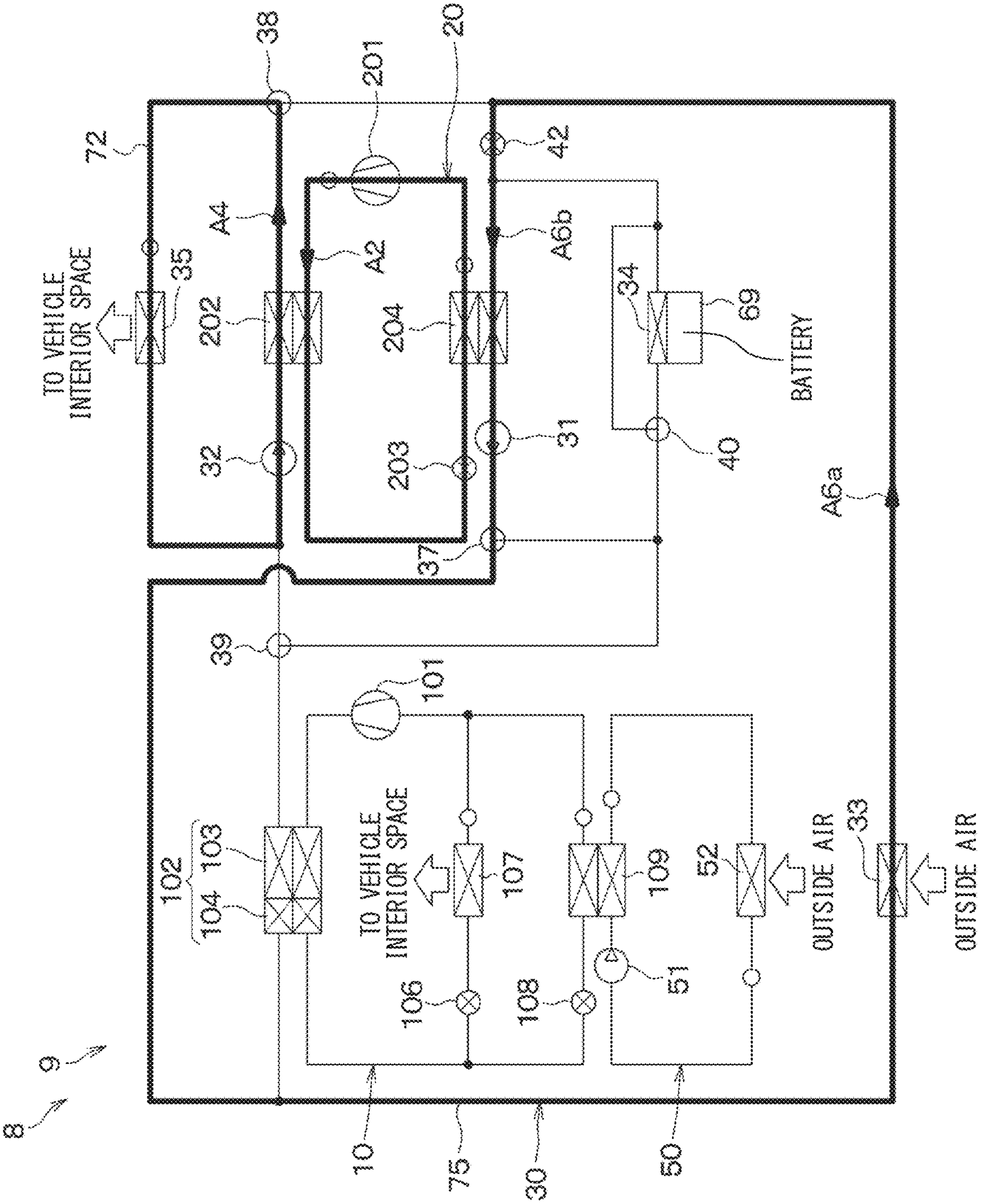
FIG. 5 is a diagram indicating a refrigerant flow and a heat medium flow, when the refrigeration cycle device is operated in a single heating mode, by thick lines in the overall configuration diagram of FIG. 1.

Next, the single heating mode of the refrigeration cycle device 9 will be described. As illustrated in FIGS. 1 and 5, the single heating mode of the refrigeration cycle device 9 is an operation mode that is performed during the heating of the vehicle interior space 68, and in which the ventilation air is warmed by the operation of the second compressor 201 without the operation of the first compressor 101. In short, the single heating mode is an operation mode for warming ventilation air with the second refrigeration cycle 20 without using the first refrigeration cycle 10.

In the single heating mode, the circuit controller 80*a* (cf. FIG. 3) controls each piece of control target equipment so that the second refrigerant and the first heat medium flow as indicated by arrows A2, A4, A6*a*, and A6*b* and thick solid lines in FIG. 5.

Specifically, in the single heating mode, the circuit controller 80*a* brings the first switching valve 37 into the first switching state, brings the second switching valve 38 into the first switching state, brings the third switching valve 39 into the first switching state, brings the bypass switching valve 40 into the first port closed state, and brings the shut valve 42 into the open state. Thereby, the circuit controller 80*a* establishes the second circulation path 72 and an outside-air heat absorption circulation path 75, through which the first heat medium circulates between the second evaporator 204 and the first outside air heat exchanger 33, in the first heat medium circuit 30. The second circulation path 72 and the outside-air heat absorption circulation path 75 are formed so that the first heat medium is prevented from flowing therebetween.

Further, as can be seen from FIGS. 4 and 5, since a part of the flow path in the outside-air heat absorption circulation path 75 in FIG. 5 overlaps with the first circulation path 71 in FIG. 4, the outside-air heat absorption circulation path 75 is not established simultaneously with the first circulation path 71. That is, the first heat medium circuit 30 is configured such that the outside-air heat absorption circulation path 75 can be established in place of the first circulation path 71. Therefore, when the vehicle interior space 68 is to be heated, the first circulation path 71 and the outside-air heat absorption circulation path 75 are selectively formed in the first heat medium circuit 30.

The circuit controller 80*a* causes the first pump 31 to operate and the first heat medium to thus circulate through the outside-air heat absorption circulation path 75 as indicated by arrows A6*a* and A6*b* in FIG. 5. Specifically, in the outside-air heat absorption circulation path 75, the first heat medium discharged from the discharge port 31*a* of the first pump 31 sequentially flows through the first switching valve 37, the first outside air heat exchanger 33, the shut valve 42, and the second evaporator 204, and is then sucked into the inlet port 31*b* of the first pump 31.

The circuit controller 80*a* causes the second pump 32 to operate and the first heat medium to thus circulate through the second circulation path 72 as indicated by arrow A4 in FIG. 5.

In the single heating mode, as in the coordinated heating mode, the circuit controller 80*a* causes the second expansion valve 203 and the second compressor 201 to operate. As a result, the second refrigerant circulates in the second refrigeration cycle 20 as indicated by arrow A2 in FIG. 5, and the ventilation air passing through the heater core 35 is heated in the casing 61 of the interior air conditioning unit 60 (cf. FIG. 2).

Since the first refrigeration cycle 10 is not used in the single heating mode, the first compressor 101 and the third pump 51 are stopped. Therefore, in the single heating mode, as in the coordinated heating mode, heat exchange is not performed between the first refrigerant and the ventilation air flowing through the casing 61 of the interior air conditioning unit 60 in the air-conditioning evaporator 107, and the air-conditioning evaporator 107 does not cool the ventilation air.

As described above, in the single heating mode, the second refrigerant and the first heat medium circulate, whereby heat is absorbed from the outside air passing through the first outside air heat exchanger 33 into the first heat medium in the outside-air heat absorption circulation path 75. The heat absorbed from the outside air into the first heat medium is sequentially transferred from the first heat medium to the second refrigerant in the second refrigeration cycle 20 and the first heat medium in the second circulation path 72, and is released from the first heat medium to the ventilation air in the heater core 35. This enables the air conditioner 8 to heat the ventilation air blown into the vehicle interior space 68, thus heating the vehicle interior space 68.

<Cooling Mode>

Figure 6:
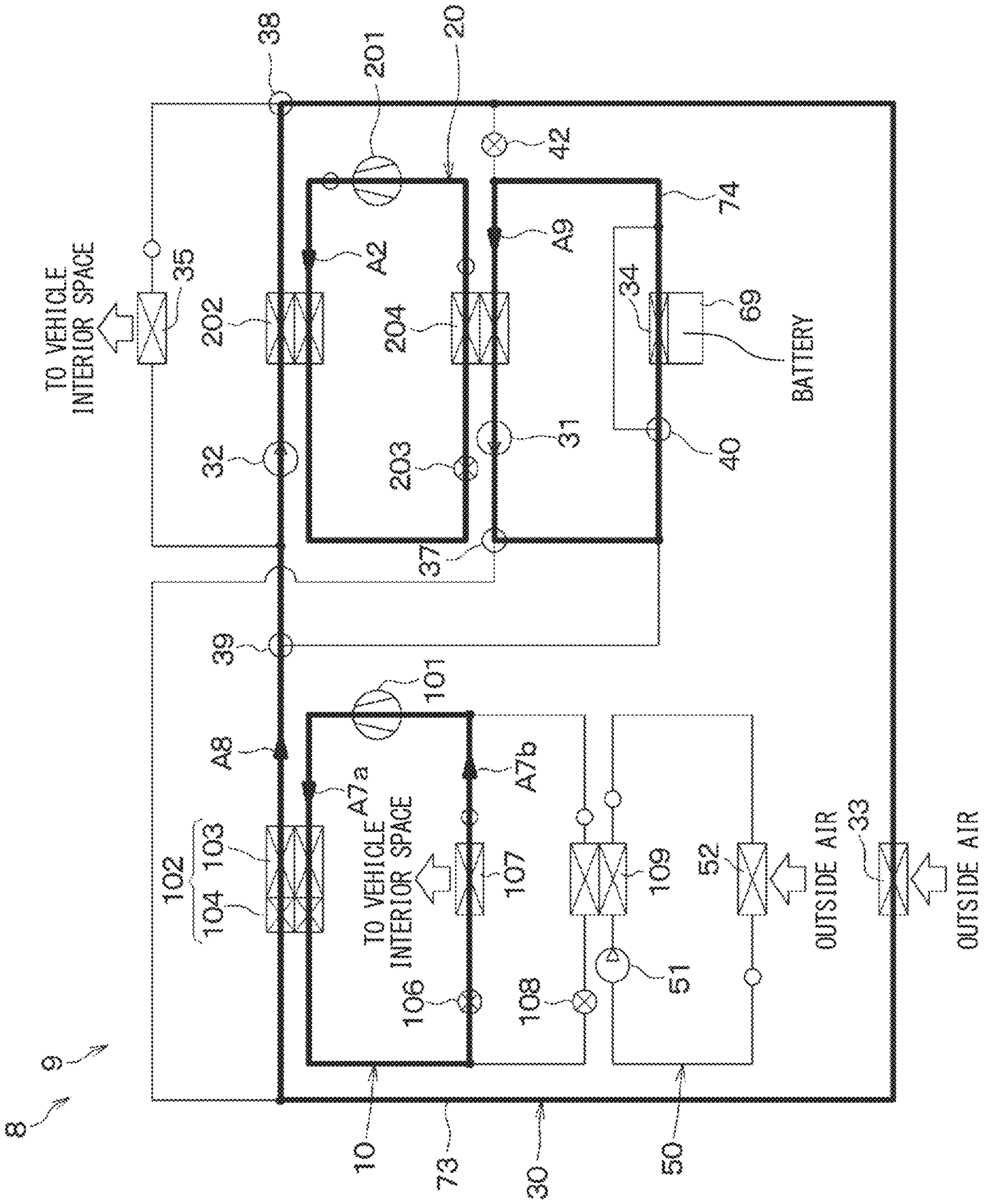
FIG. 6 is a diagram indicating a refrigerant flow and a heat medium flow, when the refrigeration cycle device is operated in a cooling mode and an equipment-cooling mode, by thick lines in the overall configuration diagram of FIG. 1.

Next, the cooling mode of the refrigeration cycle device 9 will be described. As illustrated in FIGS. 1 and 6, the cooling mode of the refrigeration cycle device 9 is an operation mode that is performed during the cooling of the vehicle interior space 68 and cools ventilation air with the operation of the first compressor 101. The cooling mode and an equipment-cooling mode to be described later are operation modes that can be executed selectively or simultaneously.

In the cooling mode, the circuit controller 80*a* (cf. FIG. 3) controls each piece of control target equipment so that the first refrigerant and the first heat medium flow as indicated by arrows A7*a*, A7*b*, and A8 and thick solid lines in FIG. 6. Arrows A2, A7*a*, A7*b*, A8, and A9 in FIG. 6 indicate the flows of the first refrigerant, the second refrigerant, and the first heat medium when the cooling mode and the equipment-cooling mode are simultaneously executed (i.e., when the equipment-cooling cooling mode is executed).

Specifically, in the cooling mode, the circuit controller 80*a* brings the first switching valve 37 into the second switching state, brings the second switching valve 38 into the second switching state, brings the third switching valve 39 into the second switching state, brings the bypass switching valve 40 into the temperature control switching state, and brings the shut valve 42 into the closed state. Thereby, the circuit controller 80*a* establishes a third circulation path 73, where the first heat medium sequentially flows through the first radiator 102, the second radiator 202, and the first outside air heat exchanger 33, in the first heat medium circuit 30.

The third circulation path 73 is formed so that the first heat medium is prevented from flowing between the third circulation path 73 path and the heater core 35. Hence, heat is not radiated from the first heat medium to the ventilation air in the heater core 35. While a fourth circulation path 74 to be described later is established in the first heat medium circuit 30 simultaneously with the establishment of the third circulation path 73, it is not necessary to circulate the first heat medium in the fourth circulation path 74 in the cooling mode.

As can be seen from FIGS. 4, 5, and 6, the third circulation path 73 and the fourth circulation path 74 in FIG. 6 are not established simultaneously with the first and second circulation paths 71, 72 in FIG. 4 or the outside-air heat absorption circulation path 75 in FIG. 5. That is, the first heat medium circuit 30 is configured such that the third circulation path 73 and the fourth circulation path 74 can be established in place of the first and second circulation paths 71, 72 and the outside-air heat absorption circulation path 75.

The circuit controller 80*a* causes the second pump 32 to operate and the first heat medium to thus circulate through the third circulation path 73 as indicated by arrow A8 in FIG. 6. Specifically, in the third circulation path 73, the first heat medium discharged from the discharge port 32*a* of the second pump 32 sequentially flows through the second radiator 202, the second switching valve 38, the first outside air heat exchanger 33, the subcooling portion 104 of the first radiator 102, the condensing portion 103 of the first radiator 102, and the third switching valve 39, and is then sucked into the inlet port 32*b* of the second pump 32.

Therefore, in the cooling mode, the heat radiation destination from the first radiator 102 via the first heat medium is outside air passing through the first outside air heat exchanger 33. That is, as can be seen from FIGS. 4 and 6, the first heat medium circuit 30 switches the heat radiation destination from the first radiator 102 to the outside air passing through the first outside air heat exchanger 33 or the second refrigerant in the second evaporator 204.

In the cooling mode, while fully closing the first expansion valve 108, the circuit controller 80*a* adjusts the throttle opening of the air-conditioning expansion valve 106 so that the air-conditioning expansion valve 106 exerts a decompressing action. The circuit controller 80*a* then causes the first compressor 101 to operate. Thus, in the first refrigeration cycle 10, the first refrigerant circulates as indicated by arrows A7*a* and A7*b* in FIG. 6. That is, the first refrigerant discharged from the discharge port 101*a* of the first compressor 101 sequentially flows through the condensing portion 103 of the first radiator 102, the subcooling portion 104 of the first radiator 102, the air-conditioning expansion valve 106, and the air-conditioning evaporator 107, and is then sucked into the inlet port 101*b* of the first compressor 101.

At this time, the air-conditioning evaporator 107 cools the ventilation air passing through the air-conditioning evaporator 107 in the casing 61 of the interior air conditioning unit 60 (cf. FIG. 2) as the first refrigerant evaporates. Since the first expansion valve 108 is fully closed, heat exchange is not performed between the first refrigerant and the second heat medium in the first evaporator 109. In the cooling mode, there is no need for causing the first pump 31, the third pump 51, and the second compressor 201 to operate.

As described above, in the cooling mode, the first refrigerant and the first heat medium circulate, whereby heat is absorbed from the ventilation air passing through the air-conditioning evaporator 107 into the first refrigerant in the first refrigeration cycle 10. The heat absorbed from the ventilation air into the first refrigerant is transferred from the first refrigerant to the first heat medium in the third circulation path 73, and is released from the first heat medium to the outside air in the first outside air heat exchanger 33. This enables the air conditioner 8 to cool the ventilation air blown into the vehicle interior space 68, thus cooling the vehicle interior space 68.

<Equipment-Cooling Mode>

Next, the equipment-cooling mode of the refrigeration cycle device 9 will be described. As illustrated in FIGS. 1 and 6, the equipment-cooling mode of the refrigeration cycle device 9 is an operation mode for cooling the battery 69 by the operation of the second compressor 201. For example, the circuit controller 80*a* selects the equipment-cooling mode when the battery 69 is to be cooled during the non-heating of the vehicle interior space 68.

In the equipment-cooling mode, the circuit controller 80*a* (cf. FIG. 3) controls each piece of control target equipment so that the second refrigerant and the first heat medium flow as indicated by arrows A2, A8, and A9 and thick solid lines in FIG. 6.

Specifically, in the equipment-cooling mode, the circuit controller 80*a* brings the switching valves 37, 38, 39, 40 and the shut valve 42 into the same switching state as in the cooling mode. Thereby, the circuit controller 80*a* establishes the third circulation path 73 and the fourth circulation path 74, through which the first heat medium circulates between the second evaporator 204 and the equipment heat exchanger 34, in the first heat medium circuit 30. The fourth circulation path 74 is formed so that the first heat medium is prevented from flowing through the heater core 35 and the third circulation path 73.

The circuit controller 80*a* causes the first pump 31 to operate and the first heat medium to thus circulate through the fourth circulation path 74 as indicated by arrow A9 in FIG. 5. Specifically, in the fourth circulation path 74, the first heat medium discharged from the discharge port 31*a* of the first pump 31 sequentially flows through the first switching valve 37, the bypass switching valve 40, the equipment heat exchanger 34, and the second evaporator 204, and is then sucked into the inlet port 31*b* of the first pump 31.

The circuit controller 80*a* causes the second pump 32 to operate and the first heat medium to thus circulate through the third circulation path 73 as indicated by arrow A8 in FIG. 6.

In the equipment-cooling mode, as in the coordinated heating mode, the circuit controller 80*a* causes the second expansion valve 203 and the second compressor 201 to operate. Thus, in the second refrigeration cycle 20, the second refrigerant circulates as indicated by arrow A2 in FIG. 6. In the equipment-cooling mode, there is no need for causing the third pump 51 and the first compressor 101 to operate.

As described above, in the equipment-cooling mode, the second refrigerant and the first heat medium circulate, whereby the equipment heat exchanger 34 absorbs heat from the battery 69 into the first heat medium in the fourth circulation path 74. The heat absorbed from the battery 69 into the first heat medium is sequentially transferred from the first heat medium to the second refrigerant in the second refrigeration cycle 20 and the first heat medium in the third circulation path 73, and is released from the first heat medium to the outside air in the first outside air heat exchanger 33. This enables the refrigeration cycle device 9 to cool the battery 69.

When the equipment-cooling mode and the cooling mode are to be performed simultaneously (i.e., when the equipment-cooling cooling mode is to be performed), the first heat medium in the third circulation path 73 absorbs heat from the first refrigerant in the first radiator 102 and absorbs heat from the second refrigerant in the second radiator 202. The heat from the first refrigerant and the heat from the second refrigerant are released from the first heat medium to the outside air by the first outside air heat exchanger 33.

<Equipment-Warming Heating Mode>

Figure 7:
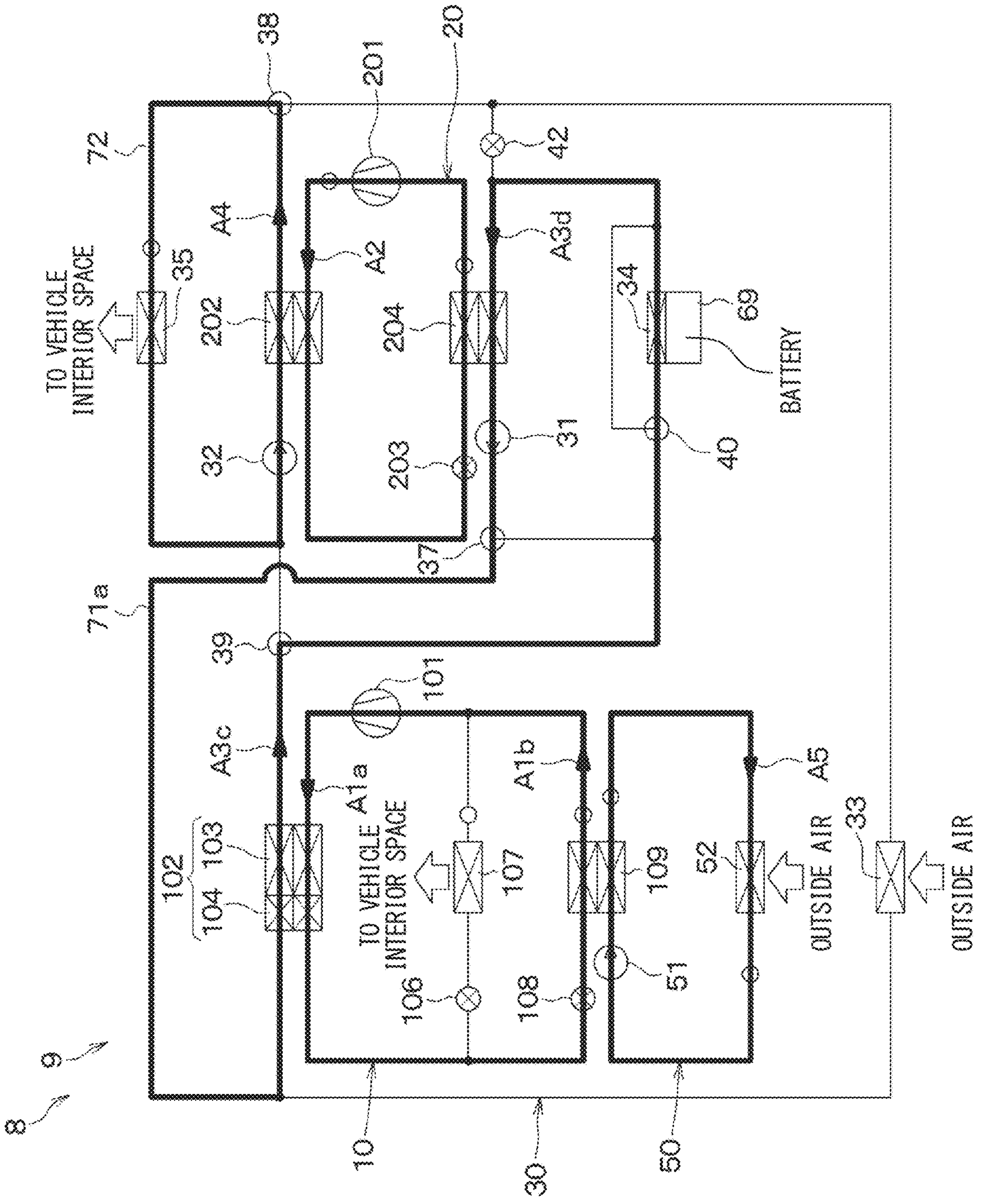
FIG. 7 is a diagram indicating a refrigerant flow and a heat medium flow, when the refrigeration cycle device is operated in an equipment-warming heating mode, by thick lines in the overall configuration diagram of FIG. 1.

Next, the equipment-warming heating mode of the refrigeration cycle device 9 will be described. As illustrated in FIGS. 1 and 7, the equipment-warming heating mode of the refrigeration cycle device 9 is an operation mode for warming the battery 69 during the heating of the vehicle interior space 68. That is, the circuit controller 80*a* selects the equipment-warming heating mode when the battery 69 is to be warmed during the heating of the vehicle interior space 68.

In the equipment-warming heating mode, the circuit controller 80*a* (cf. FIG. 3) controls each piece of control target equipment so that the first refrigerant, the second refrigerant, the first heat medium, and the second heat medium flow as indicated by arrows A1*a*, A1*b*, A2, A3*c*, A3*d*, A4, and A5 and thick solid lines in FIG. 7.

Specifically, in the equipment-warming heating mode, the circuit controller 80*a* sets the switching states of the first to third switching valves 37, 38, 39 and the shut valve 42 to the same as in the coordinated heating mode. The circuit controller 80*a* brings the bypass switching valve 40 into the temperature control switching state. Thereby, the circuit controller 80*a* establishes a first circulation path 71*a* and the second circulation path 72 in the first heat medium circuit 30.

However, in the equipment-warming heating mode, since the bypass switching valve 40 is always in the temperature control switching state, the first circulation path 71*a* in the equipment-warming heating mode is a flow path that always allows the flow of the first heat medium to the equipment heat exchanger 34, unlike the first circulation path 71 (cf. FIG. 4) in the coordinated heating mode. Except for this point, the first circulation path 71*a* in the equipment-warming heating mode is similar to the first circulation path 71 in the coordinated heating mode. Thus, in the equipment-warming heating mode, the first circulation path 71*a* becomes a circulation path where the first heat medium sequentially flows through the first radiator 102, the equipment heat exchanger 34, and the second evaporator 204.

In addition, the circuit controller 80*a* causes the first pump 31 to operate and the first heat medium to thus circulate through the first circulation path 71*a* as indicated by arrows A3*c* and A3*d* in FIG. 7. Specifically, in the first circulation path 71*a*, the first heat medium discharged from the discharge port 31*a* of the first pump 31 sequentially flows through the first switching valve 37, the subcooling portion 104 of the first radiator 102, the condensing portion 103 of the first radiator 102, the third switching valve 39, the bypass switching valve 40, the equipment heat exchanger 34, and the second evaporator 204, and is then sucked into the inlet port 31*b* of the first pump 31.

The circuit controller 80*a* causes the second pump 32, the third pump 51, the air-conditioning expansion valve 106, the first expansion valve 108, the first compressor 101, the second expansion valve 203, and the second compressor 201 to operate in the same manner as in the coordinated heating mode. Accordingly, the first heat medium in the second circulation path 72, the second heat medium in the second heat medium circuit 50, the first refrigerant in the first refrigeration cycle 10, and the second refrigerant in the second refrigeration cycle 20 circulate in the same manner as in coordinated heating mode.

At this time, for example, the circuit controller 80*a* adjusts the rotational speed of the first compressor 101 so that the temperature of the first heat medium flowing into the heat medium inlet 34*a* of the equipment heat exchanger 34 becomes a temperature suitable for warming the battery 69. At the same time, the circuit controller 80*a* adjusts the rotational speed of the second compressor 201 so that the temperature of the first heat medium flowing into the heat medium inlet 35*a* of the heater core 35 becomes a temperature suitable for heating.

As described above, in the equipment-warming heating mode, the first refrigerant, the second refrigerant, the first heat medium, and the second heat medium circulate, whereby heat is absorbed from the outside air passing through the second outside air heat exchanger 52 into the second heat medium of the second heat medium circuit 50. The heat absorbed from the outside air into the second heat medium is sequentially transferred from the second heat medium to the first refrigerant in the first refrigeration cycle 10 and the first heat medium in the first circulation path 71*a*, and is released from the first heat medium to the battery 69 in the equipment heat exchanger 34. Simultaneously with the above, the heat transferred to the first heat medium in the first circulation path 71*a* is sequentially transferred from the second evaporator 204 to the second refrigerant in the second refrigeration cycle 20 and the first heat medium in the second circulation path 72, and is released from the first heat medium to the ventilation air in the heater core 35. This enables the air conditioner 8 to simultaneously heat the ventilation air blown into the vehicle interior space 68, thus heating the vehicle interior space 68, and warm the battery 69.

<Equipment-Warming Mode>

Figure 8:
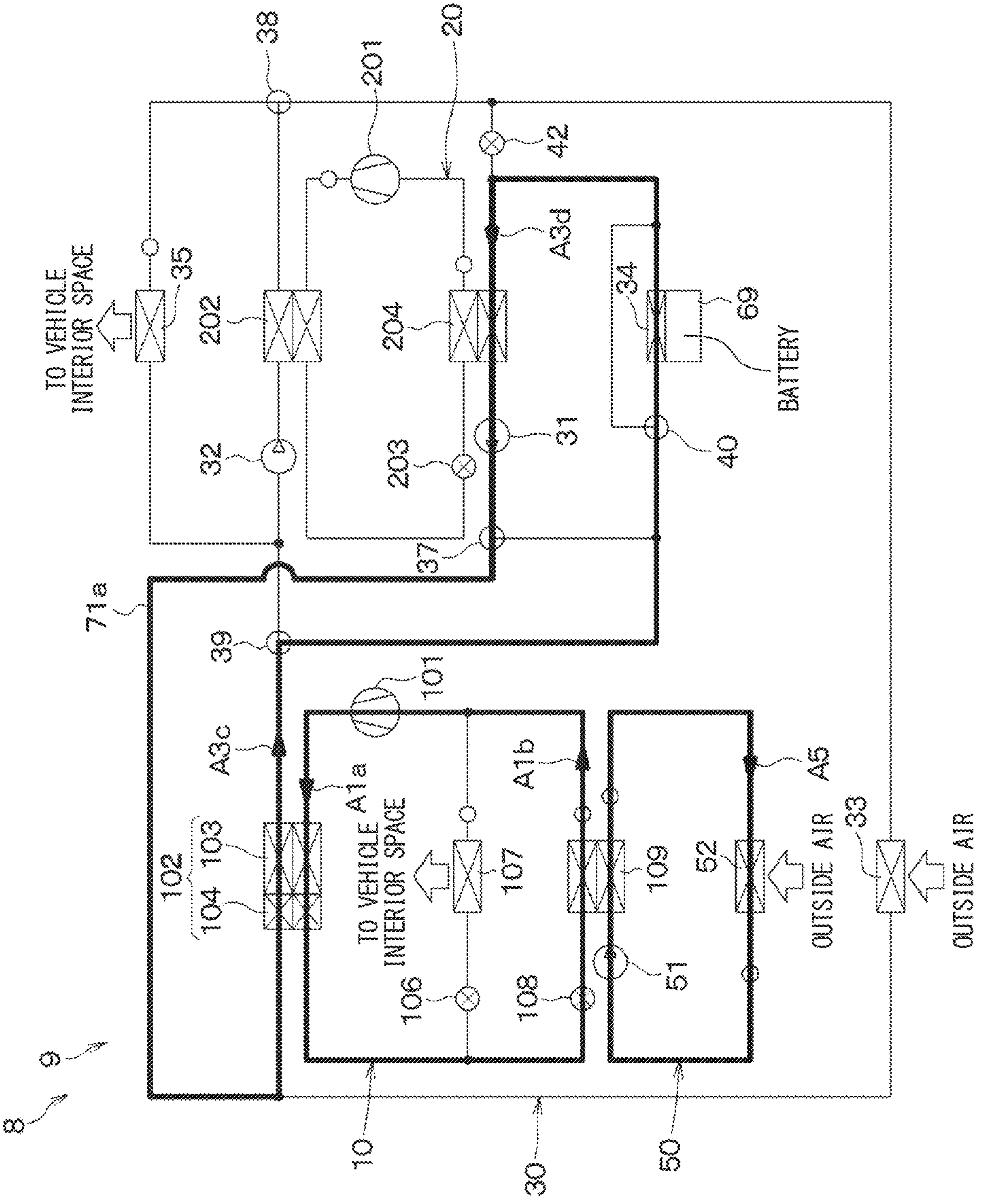
FIG. 8 is a diagram indicating a refrigerant flow and a heat medium flow, when the refrigeration cycle device is operated in an equipment-warming mode, by thick lines in the overall configuration diagram of FIG. 1.

Next, the equipment-warming mode of the refrigeration cycle device 9 will be described. As illustrated in FIGS. 1 and 8, the equipment-warming mode of the refrigeration cycle device 9 is an operation mode for warming the battery 69 during the non-heating of the vehicle interior space 68.

In the equipment-warming mode, the circuit controller 80*a* (cf. FIG. 3) controls each piece of control target equipment so that the first refrigerant, the first heat medium, and the second heat medium flow as indicated by arrows A1*a*, A1*b*, A3*c*, A3*d*, and A5 and thick solid lines in FIG. 8. Specifically, in the equipment-warming mode, the circuit controller 80*a* stops the second pump 32 and the second compressor 201. The circuit controller 80*a* does not perform the throttle opening control for the second expansion valve 203. Except for this, each piece of control target equipment operates in the equipment-warming mode in the same manner as in the equipment-warming heating mode.

Therefore, in the equipment-warming mode, the first heat medium in the first circulation path 71*a*, the second heat medium in the second heat medium circuit 50, and the first refrigerant in the first refrigeration cycle 10 circulate in the same manner as in the equipment-warming heating mode. Unlike the equipment-warming heating mode, the second refrigerant does not flow in the second refrigeration cycle 20, and the first heat medium does not flow through the heater core 35.

As described above, in the equipment-warming mode, the first refrigerant, the first heat medium, and the second heat medium circulate, whereby heat is absorbed from the outside air passing through the second outside air heat exchanger 52 into the second heat medium of the second heat medium circuit 50, as in the equipment-warming heating mode. The heat absorbed from the outside air into the second heat medium is released to the battery 69 as in the equipment-warming heating mode. This enables the air conditioner 8 to warm the battery 69.

<Equipment-Cooling Heating Mode>

Figure 9:
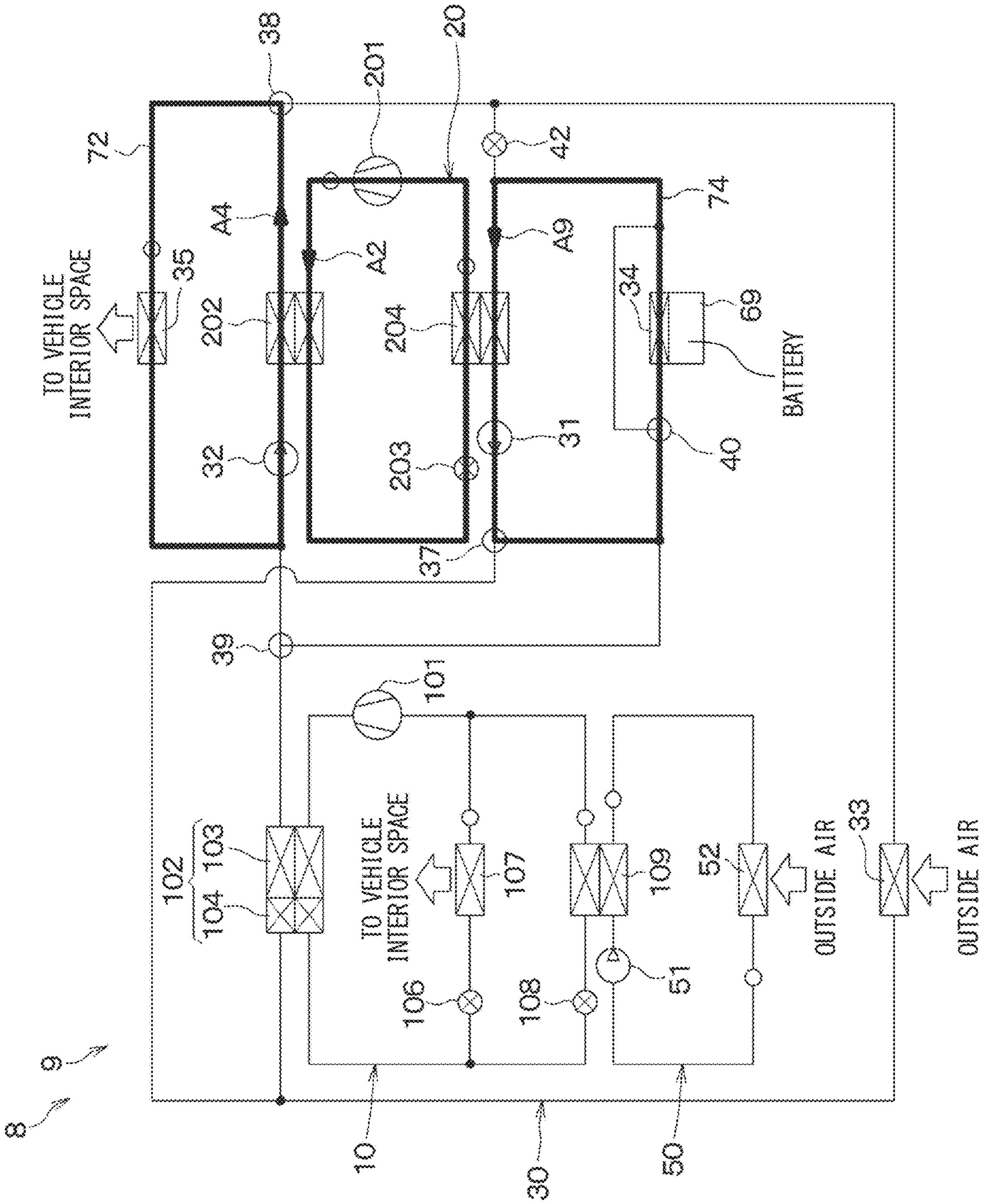
FIG. 9 is a diagram indicating a refrigerant flow and a heat medium flow, when the refrigeration cycle device is operated in an equipment-cooling heating mode, by thick lines in the overall configuration diagram of FIG. 1.

Next, the equipment-cooling heating mode of the refrigeration cycle device 9 will be described. As illustrated in FIGS. 1 and 9, the equipment-cooling heating mode of the refrigeration cycle device 9 is an operation mode for cooling the battery 69 during the heating of the vehicle interior space 68.

In the equipment-cooling heating mode, the circuit controller 80*a* (cf. FIG. 3) controls each piece of control target equipment so that the second refrigerant and the first heat medium flow as indicated by arrows A2, A4, and A9 and thick solid lines in FIG. 9.

Specifically, in the equipment-cooling heating mode, the circuit controller 80*a* brings the first switching valve 37 into the second switching state, brings the second switching valve 38 into the first switching state, brings the third switching valve 39 into the first switching state, brings the bypass switching valve 40 into the temperature control switching state, and brings the shut valve 42 into the closed state. Thereby, the circuit controller 80*a* establishes the second circulation path 72 and the fourth circulation path 74 in the first heat medium circuit 30.

The circuit controller 80*a* causes the first pump 31 to operate and the first heat medium to thus circulate in the fourth circulation path 74 as in the equipment-cooling mode as indicated by arrow A9 in FIG. 9. The circuit controller 80*a* causes the second pump 32 to operate and the first heat medium to thus circulate through the second circulation path 72 in the same manner as in the coordinated heating mode as indicated by arrow A4 in FIG. 9. The circuit controller 80*a* causes the second compressor 201 and the second expansion valve 203 to operate and the second refrigerant to thus circulate in the second refrigeration cycle 20 in the same manner as in the coordinated heating mode, as indicated by arrow A2 in FIG. 9.

As described above, in the equipment-cooling heating mode, the second refrigerant and the first heat medium circulate, whereby the equipment heat exchanger 34 absorbs heat from the battery 69 into the first heat medium. The heat absorbed from the battery 69 into the first heat medium is sequentially transferred from the first heat medium to the second refrigerant in the second refrigeration cycle 20 and the first heat medium in the second circulation path 72, and is released from the first heat medium to the ventilation air in the heater core 35. This enables the air conditioner 8 to heat the ventilation air blown into the vehicle interior space 68 to heat the vehicle interior space 68 and cool the battery 69.

<First Dehumidification and Heating Mode>

Figure 10:
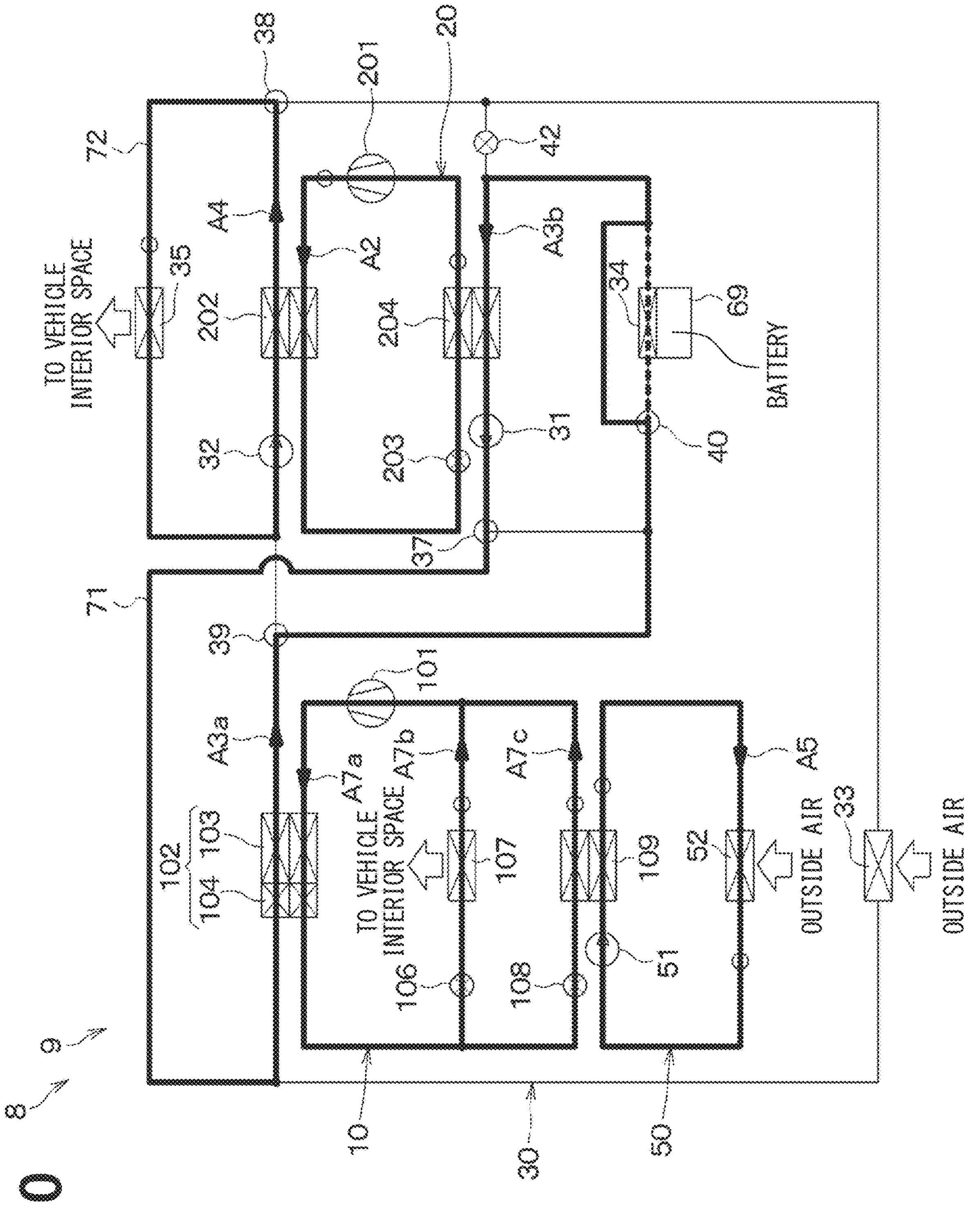
FIG. 10 is a diagram indicating a refrigerant flow and a heat medium flow, when the refrigeration cycle device is operated in a first dehumidification and heating mode, by thick lines in the overall configuration diagram of FIG. 1.

Next, the first dehumidification and heating mode of the refrigeration cycle device 9 will be described. As illustrated in FIGS. 1 and 10, the first dehumidification and heating mode of the refrigeration cycle device 9 is an operation mode performed during the dehumidification and heating of the vehicle interior space 68 with heat absorption from outside air. That is, the refrigeration cycle device 9 operated in the first dehumidification and heating mode absorbs heat from outside air with the second outside air heat exchanger 52, condenses water vapor in the ventilation air by cooling ventilation air with the air-conditioning evaporator 107, and heats the cooled ventilation air with the heater core 35.

In the first dehumidification and heating mode, the circuit controller 80*a* controls each piece of control target equipment so that the first refrigerant, the second refrigerant, the first heat medium, and the second heat medium flow, as indicated by arrows A2, A3*a*, A3*b*, A4, A5, A7*a*, A7*b*, and A7*c* and thick solid lines in FIG. 10.

Specifically, in the first dehumidification and heating mode, the circuit controller 80*a* does not fully close the air-conditioning expansion valve 106 but adjusts the throttle opening of the air-conditioning expansion valve 106 so that the air-conditioning expansion valve 106 exerts a decompressing action. Except for this, each piece of control target equipment operates in the first dehumidification and heating mode in the same manner as in the coordinated heating mode.

Therefore, the circuit controller 80*a* establishes the first circulation path 71 and the second circulation path 72 in the first heat medium circuit 30. The first heat medium in the first circulation path 71, the first heat medium in the second circulation path 72, the second heat medium in the second heat medium circuit 50, and the second refrigerant in the second refrigeration cycle 20 circulate in the same manner as in coordinated heating mode.

However, in the first refrigeration cycle 10, the first refrigerant that has flowed out from the first radiator 102 flows to the air-conditioning evaporator 107 through the air-conditioning expansion valve 106 as indicated by arrow A7*b*, and flows to the first evaporator 109 through the first expansion valve 108 as indicated by arrow A7*c*. The first refrigerant that has flowed out from the air-conditioning evaporator 107 and the first refrigerant that has flowed out from the first evaporator 109 are both sucked into the inlet port 101*b* of the first compressor 101.

As described above, in the first dehumidification and heating mode, the first refrigerant, the second refrigerant, the first heat medium, and the second heat medium circulate, whereby heat is absorbed from outside air into the first refrigerant via the second heat medium in the first evaporator 109, and heat is absorbed from the ventilation air into the first refrigerant in the air-conditioning evaporator 107. The heat absorbed from the outside air and the ventilation air into the first refrigerant is sequentially transferred from the first radiator 102 to the first heat medium in the first circulation path 71, the second refrigerant in the second refrigeration cycle 20, and the first heat medium in the second circulation path 72, and is released from the first heat medium to the ventilation air in the heater core 35. As a result, the refrigeration cycle device 9 can absorb heat from the outside air with the second outside air heat exchanger 52, cool ventilation air with the air-conditioning evaporator 107, and heat the cooled ventilation air with the heater core 35.

In the first dehumidification and heating mode, as in the coordinated heating mode, the circuit controller 80*a* basically brings the bypass switching valve 40 into the bypass switching state, but may bring the bypass switching valve 40 into the temperature control switching state.

<Second Dehumidification and Heating Mode>

Figure 11:
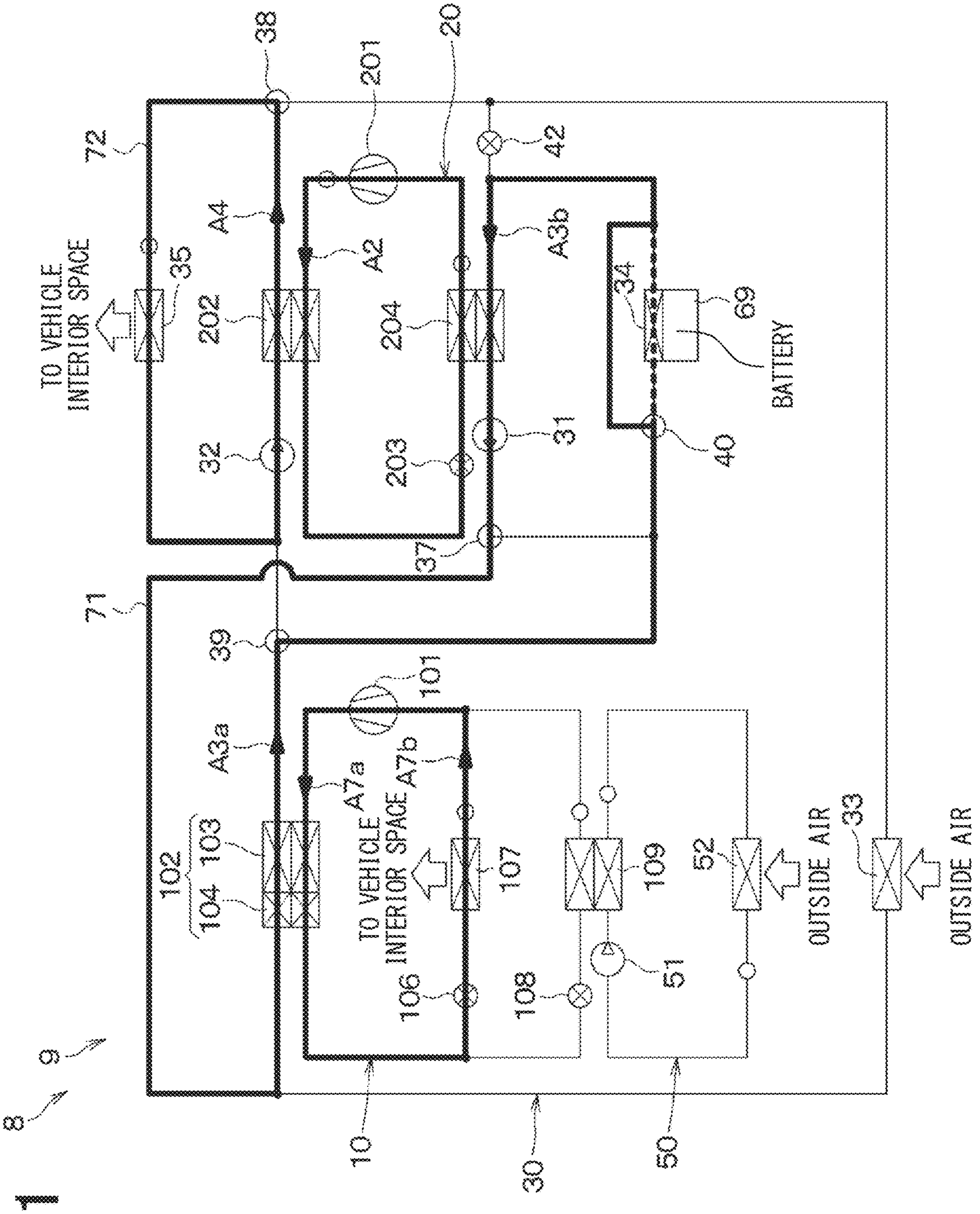
FIG. 11 is a diagram indicating a refrigerant flow and a heat medium flow, when the refrigeration cycle device is operated in a second dehumidification and heating mode, by thick lines in the overall configuration diagram of FIG. 1.

Next, the second dehumidification and heating mode of the refrigeration cycle device 9 will be described. As illustrated in FIGS. 1 and 11, the second dehumidification and heating mode of the refrigeration cycle device 9 is an operation mode performed during the dehumidification and heating of the vehicle interior space 68 without absorbing heat from outside air. Therefore, in the second dehumidification and heating mode, as in the first dehumidification and heating mode, the refrigeration cycle device 9 cools ventilation air with the air-conditioning evaporator 107, thus condensing the water vapor in the ventilation air, and heats the cooled ventilation air with the heater core 35. However, in the second dehumidification and heating mode, the refrigeration cycle device 9 does not perform heat exchange between the outside air and the second heat medium in the second outside air heat exchanger 52.

In the second dehumidification and heating mode, the circuit controller 80*a* controls each piece of control target equipment so that the first refrigerant, the second refrigerant, and the first heat medium flow as indicated by arrows A2, A3*a*, A3*b*, A4, A7*a*, and A7*b* and thick solid lines in FIG. 11.

Specifically, in the second dehumidification and heating mode, while fully closing the first expansion valve 108, the circuit controller 80*a* adjusts the throttle opening of the air-conditioning expansion valve 106 so that the air-conditioning expansion valve 106 exerts a decompressing action. The circuit controller 80*a* stops the third pump 51. Except for this, each piece of control target equipment operates in the second dehumidification and heating mode in the same manner as in the first dehumidification and heating mode.

Therefore, the circuit controller 80*a* establishes the first circulation path 71 and the second circulation path 72 in the first heat medium circuit 30. The first heat medium in the first circulation path 71, the first heat medium in the second circulation path 72, and the second refrigerant in the second refrigeration cycle 20 circulate in the same manner as in the first dehumidification and heating mode.

However, in the first refrigeration cycle 10, the first refrigerant that has flowed out from the first radiator 102 flows to the air-conditioning evaporator 107 through the air-conditioning expansion valve 106 as indicated by arrow A7*b*, but does not flow to the first evaporator 109. Hence, heat exchange is not performed between the first refrigerant and the second heat medium in the first evaporator 109. In addition, the second heat medium does not circulate in the second heat medium circuit 50.

As described above, in the second dehumidification and heating mode, the first refrigerant, the second refrigerant, and the first heat medium circulate, whereby heat is absorbed from the ventilation air into the first refrigerant in the air-conditioning evaporator 107. The heat absorbed from the ventilation air into the first refrigerant is sequentially transferred from the first radiator 102 to the first heat medium in the first circulation path 71, the second refrigerant in the second refrigeration cycle 20, and the first heat medium in the second circulation path 72, and is released from the first heat medium to the ventilation air in the heater core 35. This enables the refrigeration cycle device 9 to cool ventilation air with the air-conditioning evaporator 107 and heat the cooled ventilation air with the heater core 35.

In the second dehumidification and heating mode, as in the first dehumidification and heating mode, the circuit controller 80*a* basically brings the bypass switching valve 40 into the bypass switching state, but may bring the bypass switching valve 40 into the temperature control switching state.

Each operation mode of the refrigeration cycle device 9 has been described above.

Depending on the operation mode selected from the plurality of operation modes described above, both the first compressor 101 and the second compressor 201 may be in operation. When the rotational speeds of both the first and second compressors 101, 201 are to be increased during the operation of both the first and second compressors 101, 201, the circuit controller 80*a* increases one of the rotational speed of the first compressor 101 or the rotational speed of the second compressor 201 earlier than the other. In short, when the rotational speeds of both the first and second compressors 101, 201 are to be increased, the circuit controller 80*a* shifts the timing of increasing the rotational speed of the first compressor 101 from the timing of increasing the rotational speed of the second compressor 201.

For example, as illustrated in FIG. 12, depending on the situation at the time of increasing the rotational speeds of the first and second compressors 101, 201, the circuit controller 80*a* determines which one of the first and second compressors 101, 201 will have its rotational speed increased earlier. The description "priority" in FIG. 12 indicates one of the first and second compressors 101, 201, the rotational speed of which is increased earlier.

Specifically, in the coordinated heating mode illustrated in FIG. 4, both the first compressor 101 and the second compressor 201 are in operation as described above. In the coordinated heating mode, the circuit controller 80*a* selects the first rotational speed increasing pattern in the case of improving heating efficiency when both the rotational speeds of both the first and second compressors 101, 201 are to be increased. The first rotational speed increasing pattern is a rotational speed increasing pattern for increasing the rotational speed of the first compressor 101 earlier than the rotational speed of the second compressor 201. The circuit controller 80*a* increases the rotational speed of each of the first compressor 101 and the second compressor 201 in the selected first rotational speed increasing pattern. For example, in this case, the circuit controller 80*a* increases the rotational speed of the first compressor 101 earlier than the rotational speed of the second compressor 201 as illustrated in the time chart of FIG. 13.

As a result, the heating efficiency is improved compared to a case where the rotational speed of each of the first compressor 101 and the second compressor 201 is increased in the second rotational speed increasing pattern to be described later. When the heating efficiency is represented by Rh, the heating efficiency Rh can be calculated, for example, by an equation "Rh=Wh/Wc", based on the heat amount Wh per unit time supplied to the ventilation air in the heater core 35 and the total power consumption Wc of the first and second compressors 101, 201.

On the other hand, in the coordinated heating mode, the circuit controller 80*a* selects the second rotational speed increasing pattern in the case of improving heating performance when the rotational speeds of both the first and second compressors 101, 201 are to be increased. The second rotational speed increasing pattern is a rotational speed increasing pattern for increasing the rotational speed of the second compressor 201 earlier than the rotational speed of the first compressor 101. The circuit controller 80*a* increases the rotational speed of each of the first compressor 101 and the second compressor 201 in the selected second rotational speed increasing pattern. For example, in this case, the circuit controller 80*a* increases the rotational speed of the second compressor 201 earlier than the rotational speed of the first compressor 101 as illustrated in the time chart of FIG. 14.

As a result, the heating performance is improved compared to the case where the rotational speed of each of the first compressor 101 and the second compressor 201 is increased in the first rotational speed increasing pattern. The heating performance can be expressed by, for example, a heat amount Wh per unit time supplied to the ventilation air in the heater core 35.

For example, it is assumed that the operation panel 82 is provided with a predetermined switch that is turned on by the occupant when the occupant requests an early increase in the temperature of the vehicle interior space 68 during heating. In this case, when the predetermined switch is on during heating, it is considered that there is a high need to improve heating performance. On the other hand, when the predetermined switch is off during heating, the refrigeration cycle device 9 is preferably operated to improve heating efficiency rather than to improve heating performance.

When the predetermined switch provided on the operation panel 82 is off in the coordinated heating mode, the circuit controller 80*a* determines this as "the case of improving heating efficiency". Thus, in the coordinated heating mode, when the rotational speeds of both the first and second compressors 101, 201 are to be increased, if the predetermined switch is off, the circuit controller 80*a* selects the first rotational speed increasing pattern.

On the other hand, when the predetermined switch provided on the operation panel 82 is on in the coordinated heating mode, the circuit controller 80*a* determines this as "the case of improving heating performance". Thus, in the coordinated heating mode, when the rotational speeds of both the first and second compressors 101, 201 are to be increased, if the predetermined switch is on, the circuit controller 80*a* selects the second rotational speed increasing pattern. As described above, when the rotational speeds of both the first and second compressors 101, 201 are to be increased in the coordinated heating mode, the circuit controller 80*a* switches to one of the first and second compressors 101, 201, the rotational speed of which is increased earlier, according to the operation of the occupant.

In the equipment-cooling cooling mode illustrated in FIG. 6, both the first compressor 101 and the second compressor 201 are in operation as described above, and the cooling of the vehicle interior space 68 and the cooling of the battery 69 are performed simultaneously.

In the equipment-cooling cooling mode, the circuit controller 80*a* selects the first rotational speed increasing pattern in the case of prioritizing improvement in cooling performance over battery cooling performance when the rotational speeds of both the first and second compressors 101, 201 are to be increased. The circuit controller 80*a* increases the rotational speed of each of the first compressor 101 and the second compressor 201 in the selected first rotational speed increasing pattern. For example, in this case, the circuit controller 80*a* increases the rotational speed of the first compressor 101 earlier than the rotational speed of the second compressor 201 as illustrated in the time chart of FIG. 13.

On the other hand, in the equipment-cooling cooling mode, the circuit controller 80*a* selects the second rotational speed increasing pattern in the case of prioritizing improvement in battery cooling performance over cooling performance when the rotational speeds of both the first and second compressors 101, 201 are to be increased. The circuit controller 80*a* increases the rotational speed of each of the first compressor 101 and the second compressor 201 in the selected second rotational speed increasing pattern. For example, in this case, the circuit controller 80*a* increases the rotational speed of the second compressor 201 earlier than the rotational speed of the first compressor 101 as illustrated in the time chart of FIG. 14.

The cooling performance can be expressed by, for example, the amount of heat per unit time that the first refrigerant absorbs from the ventilation air in the air-conditioning evaporator 107. The battery cooling performance can be expressed by, for example, the amount of heat per unit time that the first heat medium absorbs from the battery 69 in the equipment heat exchanger 34.

In the equipment-cooling cooling mode, as illustrated in FIG. 6, the first compressor 101 operates exclusively for cooling, and it is thus considered that there is a higher need to improve the cooling performance as the load on the first compressor 101 increases. The second compressor 201 operates exclusively for cooling the battery 69, and it is thus considered that there is a higher need to improve the battery cooling performance as the load on the second compressor 201 increases.

Therefore, in the equipment-cooling cooling mode, for example, when the load on the first compressor 101 is larger than the load on the second compressor 201, the circuit controller 80*a* determines this as "the case of prioritizing improvement in cooling performance over battery cooling performance". Therefore, in the equipment-cooling cooling mode, when the rotational speeds of both the first and second compressors 101, 201 are to be increased, if the load on the first compressor 101 is larger than the load on the second compressor 201, the circuit controller 80*a* selects the first rotational speed increasing pattern.

On the other hand, in the equipment-cooling cooling mode, for example, when the load on the second compressor 201 is larger than the load on the first compressor 101, the circuit controller 80*a* determines this as "the case of prioritizing improvement in battery cooling performance over cooling performance". Therefore, in the equipment-cooling cooling mode, when the rotational speeds of both the first and second compressors 101, 201 are to be increased, if the load on the second compressor 201 is larger than the load on the first compressor 101, the circuit controller 80*a* selects the second rotational speed increasing pattern.

The power consumption of the first compressor 101 increases as the load on the first compressor 101 increases, and the relationship between the load on the second compressor 201 and its power consumption is similar. Therefore, the circuit controller 80*a* adopts the power consumption of the first compressor 101 as the index value indicating the load on the first compressor 101, and adopts the power consumption of the second compressor 201 as the index value indicating the load on the second compressor 201. The circuit controller 80*a* compares the power consumption of the first compressor 101 with the power consumption of the second compressor 201 to determine which load is larger or smaller between the first compressor 101 and the second compressor 201.

Also, in the first dehumidification and heating mode illustrated in FIG. 10 or the second dehumidification and heating mode illustrated in FIG. 11, both first compressor 101 and second compressor 201 are in operation as described above.

Figure 14:
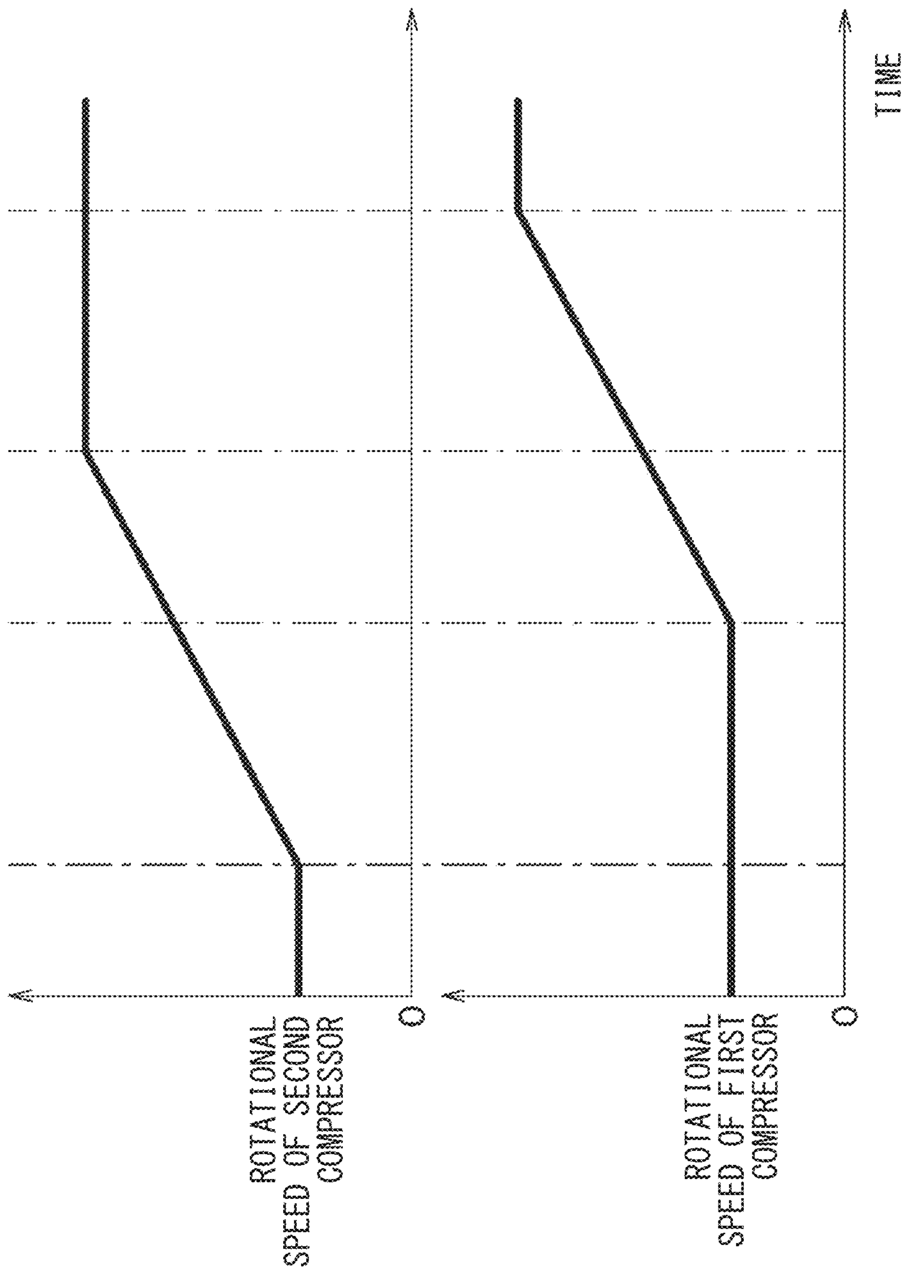
FIG. 14 is a time chart showing a case where the rotational speed of each of the first and second compressors is increased in a second rotational speed increasing pattern for increasing the rotational speed of the second compressor earlier than the rotational speed of the first compressor in the first embodiment.

When the rotational speeds of both the first and second compressors 101, 201 are to be increased in the first dehumidification and heating mode or the second dehumidification and heating mode, the circuit controller 80*a* increases the rotational speed of the second compressor 201 earlier than the rotational speed of the first compressor 101, for example, as illustrated in FIG. 14. That is, in this case, the circuit controller 80*a* selects the second rotational speed increasing pattern, and increases the rotational speed of each of the first compressor 101 and the second compressor 201 in the selected second rotational speed increasing pattern.

As described above, according to the present embodiment, as illustrated in FIGS. 4 and 6, the first refrigeration cycle 10 in which the first refrigerant circulates includes the first compressor 101, the first radiator 102, the air-conditioning expansion valve 106, the air-conditioning evaporator 107, the first expansion valve 108, and the first evaporator 109. In the air-conditioning evaporator 107, for example, in the cooling mode, the first refrigerant absorbs heat from the ventilation air blown into the vehicle interior space 68 as the first refrigerant evaporates. In the first evaporator 109, for example, in the coordinated heating mode, the first refrigerant absorbs heat from outside air as the first refrigerant evaporates. The second refrigeration cycle 20 in which the second refrigerant circulates includes a second compressor 201, a second radiator 202, a second expansion valve 203, and a second evaporator 204. The second radiator 202 radiates heat from the second refrigerant in the second radiator 202 to the ventilation air via the first heat medium, for example, in the coordinated heating mode. Furthermore, the first heat medium circuit 30 switches the heat radiation destination from the first radiator 102 to the outside air passing through the first outside air heat exchanger 33 or the second refrigerant in the second evaporator 204. For example, the heat radiation destination from the first radiator 102 is switched to the outside air passing through the first outside air heat exchanger 33 in the cooling mode, and is switched to the second refrigerant in the second evaporator 204 in the coordinated heating mode.

Therefore, the first refrigeration cycle 10 and the second refrigeration cycle 20 can be divided in roles, and for example, the first refrigeration cycle 10 can be configured for the purpose of cooling the vehicle interior space 68 and the second refrigeration cycle 20 can be configured for the purpose of heating the vehicle interior space 68.

Figure 15:
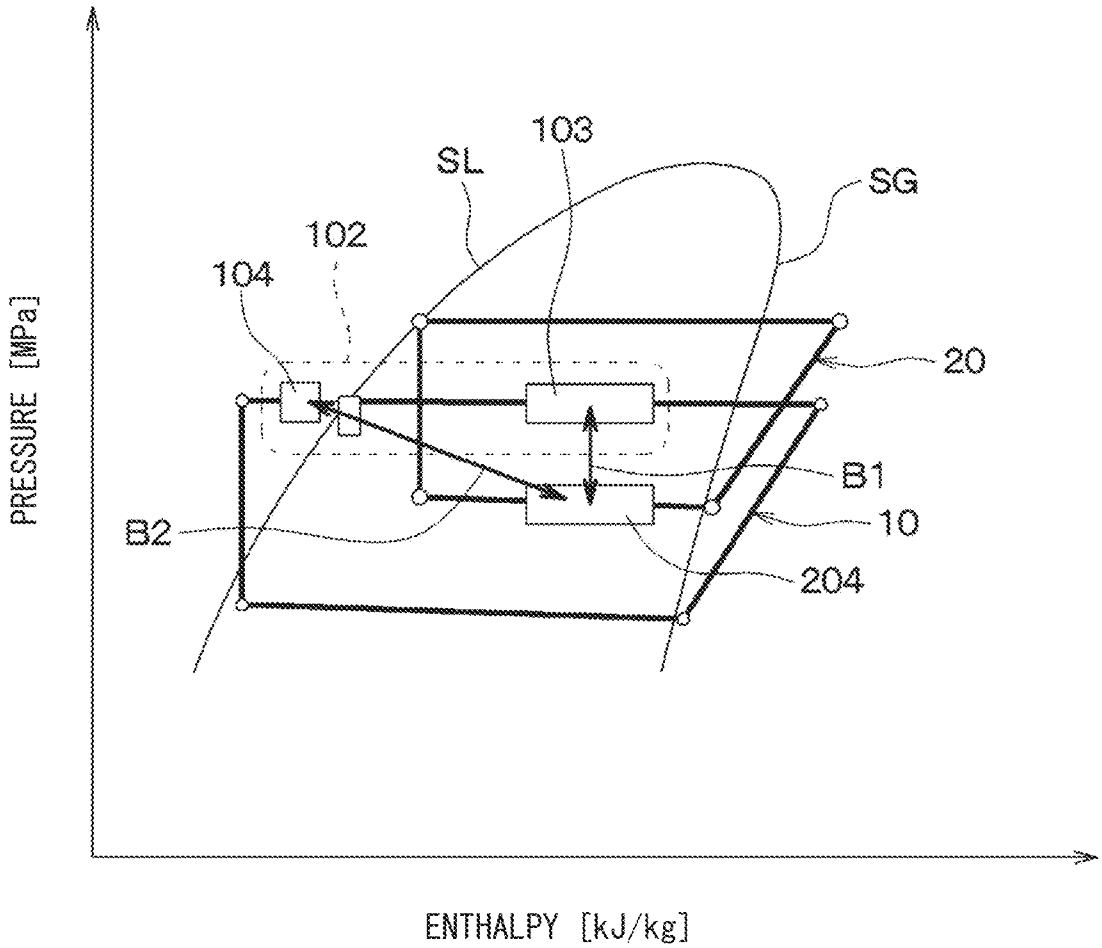
FIG. 15 is a Mollier chart showing respective states of a first refrigerant in a first refrigeration cycle and a second refrigerant in a second refrigeration cycle when the refrigeration cycle device is operated in the coordinated heating mode.

In the coordinated heating mode, the temperature and pressure of the second refrigerant on the low-temperature side of the second refrigeration cycle 20 are raised by the first refrigeration cycle 10 as illustrated in a Mollier chart of FIG. 15. Thus, by causing the first and second refrigeration cycles 10, 20 to cooperate with each other, it is possible to improve the heating efficiency compared to a case where the refrigeration cycle device 9 includes only a single refrigeration cycle, while obtaining a sufficient heat radiation amount from the second refrigerant in the second radiator 202. Accordingly, the efficiency of the refrigeration cycle device 9 can be increased during both the cooling and heating of the vehicle interior space 68.

Arrow B1 in FIG. 15 indicates heat exchange between the first refrigerant in the condensing portion 103 of the first radiator 102 and the second refrigerant in the second evaporator 204 via the first heat medium. Arrow B2 represents heat exchange via the first heat medium between the first refrigerant in the subcooling portion 104 of the first radiator 102 and the second refrigerant in the second evaporator 204.

According to the present embodiment, the first refrigeration cycle 10 in which the first refrigerant circulates includes the first compressor 101, the first radiator 102, the first expansion valve 108, and the first evaporator 109. In the first evaporator 109, for example, in the coordinated heating mode, the first refrigerant absorbs heat from outside air as the first refrigerant evaporates. The second refrigeration cycle 20 in which the second refrigerant circulates includes a second compressor 201, a second radiator 202, a second expansion valve 203, and a second evaporator 204. For example, in the coordinated heating mode, the first heat medium circuit 30 transfers the heat released from the first refrigerant in the first radiator 102 to the second refrigerant in the second evaporator 204.

Therefore, for example, in the coordinated heating mode, as described above, the temperature and pressure of the second refrigerant on the low-temperature side of the second refrigeration cycle 20 are raised by the first refrigeration cycle 10. Thus, by causing the first and second refrigeration cycles 10, 20 to cooperate with each other, it is possible to increase the efficiency of the refrigeration cycle device 9 compared to, for example, a case where the refrigeration cycle device 9 includes only a single refrigeration cycle, while obtaining a sufficient amount of heat radiation from the second refrigerant in the second radiator 202.

(1) According to the present embodiment, when the vehicle interior space 68 is to be heated, the circuit controller 80*a* sets the operation mode of the refrigeration cycle device 9 to the coordinated heating mode, for example. In the coordinated heating mode, the circuit controller 80*a* establishes the first circulation path 71, through which the first heat medium circulates, between the first radiator 102 and the second evaporator 204, and the second circulation path 72, through which the first heat medium circulates between the second radiator 202 and the heater core 35, in the first heat medium circuit 30. In the first refrigeration cycle 10, the circuit controller 80*a* allows the first refrigerant to flow from the first radiator 102 to the first expansion valve 108 and the first evaporator 109.

On the other hand, when the vehicle interior space 68 is to be cooled, the circuit controller 80*a* sets the operation mode of the refrigeration cycle device 9 to the cooling mode, for example. In the cooling mode, the circuit controller 80*a* establishes the third circulation path 73, through which the first heat medium circulates between the first radiator 102 and the first outside air heat exchanger 33, in the first heat medium circuit 30. In the first refrigeration cycle 10, the circuit controller 80*a* allows the first refrigerant to flow from the first radiator 102 to the air-conditioning expansion valve 106 and the air-conditioning evaporator 107.

Therefore, by switching the flow channel for the first heat medium in the first heat medium circuit 30, the operation mode of the refrigeration cycle device 9 can be switched between the coordinated heating mode for heating the vehicle interior space 68 and the cooling mode for cooling the vehicle interior space 68. The first refrigeration cycle 10 can be used in either the coordinated heating mode or the cooling mode. Furthermore, during the heating of the vehicle interior space 68, the first refrigeration cycle 10 can be used to improve heating efficiency as described above with reference to the Mollier chart of FIG. 15.

(2) According to the present embodiment, as illustrated in FIG. 6, when the battery 69 is to be cooled during the non-heating of the vehicle interior space 68, the circuit controller 80*a* sets the operation mode of the refrigeration cycle device 9 to the equipment-cooling mode, for example. In the equipment-cooling mode, the circuit controller 80*a* establishes, in the first heat medium circuit 30, the third circulation path 73 and the fourth circulation path 74, in which the first heat medium is prevented from flowing through the third circulation path 73, and through which the first heat medium flows between the second evaporator 204 and the equipment heat exchanger 34. In this case, specifically, the third circulation path 73 is a circulation path where the first heat medium sequentially flows through the first radiator 102, the second radiator 202, and the first outside air heat exchanger 33. The circuit controller 80*a* causes the first heat medium to circulate in each of the third circulation path 73 and the fourth circulation path 74 and causes the second compressor 201 to operate.

Therefore, by switching the flow channel for the first heat medium in the first heat medium circuit 30, the operation mode of the refrigeration cycle device 9 can be switched to the equipment-cooling mode for cooling the battery 69. The circuit controller 80*a* can simultaneously perform the cooling mode together with the equipment-cooling mode.

(3) According to the present embodiment, as illustrated in FIGS. 7 and 8, when the battery 69 is to be warmed, the circuit controller 80*a* sets the operation mode of the refrigeration cycle device 9 to the equipment-warming heating mode or the equipment-warming mode, for example. In the equipment-warming heating mode or the equipment-warming mode, the circuit controller 80*a* establishes the first circulation path 71*a* in the first heat medium circuit 30. In this case, specifically, the first circulation path 71*a* is a circulation path where the first heat medium sequentially flows through the first radiator 102, the equipment heat exchanger 34, and the second evaporator 204. The circuit controller 80*a* causes the first heat medium to circulate through the first circulation path 71*a* and the first compressor 101 to operate, and allows the first refrigerant to flow from the first radiator 102 to the first expansion valve 108 and the first evaporator 109 in the first refrigeration cycle 10.

Therefore, by switching the flow channel for the first heat medium in the first heat medium circuit 30, the operation mode of the refrigeration cycle device 9 can be switched to the equipment-warming heating mode or the equipment-warming mode for warming the battery 69. The circuit controller 80*a* can warm the battery 69 during the heating of the vehicle interior space 68 or warm the battery 69 during the non-heating of the vehicle interior space 68.

(4) According to the present embodiment, as illustrated in FIG. 7, when the battery 69 is to be warmed during the heating of the vehicle interior space 68, the circuit controller 80*a* sets the operation mode of the refrigeration cycle device 9 to the equipment-warming heating mode, for example. In the equipment-warming heating mode, the circuit controller 80*a* establishes the first circulation path 71*a* and the second circulation path 72 in the first heat medium circuit 30, and causes the first heat medium to circulate in each of the first circulation path 71*a* and the second circulation path 72. The circuit controller 80*a* causes the first compressor 101 and second compressor 201 to operate, and allows the first refrigerant to flow from the first radiator 102 to the first expansion valve 108 and the first evaporator 109 in the first refrigeration cycle 10.

Therefore, by switching the flow channel for the first heat medium in the first heat medium circuit 30, the operation mode of the refrigeration cycle device 9 can be switched to the equipment-warming heating mode for warming the battery 69 during the heating of the vehicle interior space 68.

(5) According to the present embodiment, as illustrated in FIG. 9, when the battery 69 is to be cooled during the heating of the vehicle interior space 68, the circuit controller 80*a* sets the operation mode of the refrigeration cycle device 9 to the equipment-cooling heating mode, for example. In the equipment-cooling heating mode, the circuit controller 80*a* establishes the second circulation path 72 and the fourth circulation path 74 in the first heat medium circuit 30. The circuit controller 80*a* causes the first heat medium to circulate through the second circulation path 72 and the fourth circulation path 74 and causes the second compressor 201 to operate.

Therefore, by switching the flow channel for the first heat medium in the first heat medium circuit 30, the operation mode of the refrigeration cycle device 9 can be switched to the equipment-cooling heating mode for cooling the battery 69 during the heating of the vehicle interior space 68.

(6) According to the present embodiment, as illustrated in FIG. 5, the first heat medium circuit 30 is configured to establish the outside-air heat absorption circulation path 75 in which the first heat medium is prevented from flowing through the second circulation path 72, and through which the first heat medium circulates between the second evaporator 204 and the first outside air heat exchanger 33. when the vehicle interior space 68 is to be heated, the circuit controller 80*a* sets the operation mode of the refrigeration cycle device 9 to the coordinated heating mode or the single heating mode, for example. In the single heating mode, the circuit controller 80*a* establishes the second circulation path 72 and the outside-air heat absorption circulation path 75 in the first heat medium circuit 30. The circuit controller 80*a* causes the first heat medium to circulate through the second circulation path 72 and the outside-air heat absorption circulation path 75, and causes the second compressor 201 to operate.

Therefore, when the vehicle interior space 68 is to be heated, the circuit controller 80*a* can select not only the coordinated heating mode but also the single heating mode in place of the coordinated heating mode as the operation mode of the refrigeration cycle device 9. In the single heating mode, the ventilation air can be warmed by the operation of the second compressor 201 without the operation of the first compressor 101.

(7) According to the present embodiment, as illustrated in FIG. 2, when the vehicle interior space 68 is to be dehumidified and heated, the heater core 35 is disposed in the casing 61 of the interior air conditioning unit 60 to heat the ventilation air that has flowed out from the air-conditioning evaporator 107. As illustrated in FIGS. 10 and 11, when the vehicle interior space 68 is to be dehumidified and heated, the circuit controller 80*a* sets the operation mode of the refrigeration cycle device 9 to the first dehumidification and heating mode or the second dehumidification and heating mode, for example. In the first dehumidification and heating mode or the second dehumidification and heating mode, the circuit controller 80*a* establishes the first circulation path 71 and the second circulation path 72 in the first heat medium circuit 30. The circuit controller 80*a* causes the first heat medium to circulate through each of the first circulation path 71 and the second circulation path 72, and causes the first compressor 101 and the second compressor 201 to operate. At the same time, the circuit controller 80*a* allows the first refrigerant to flow from the first radiator 102 to the air-conditioning expansion valve 106 and the air-conditioning evaporator 107 in the first refrigeration cycle 10.

Therefore, by switching the flow channel for the first heat medium in the first heat medium circuit 30, the operation mode of the refrigeration cycle device 9 can be switched to the first dehumidification and heating mode or the second dehumidification and heating mode for dehumidifying and heating the vehicle interior space 68. It is possible to switch whether to absorb heat from outside air by switching between the first dehumidification and heating mode and the second dehumidification and heating mode during the dehumidification and heating.

Figure 13:
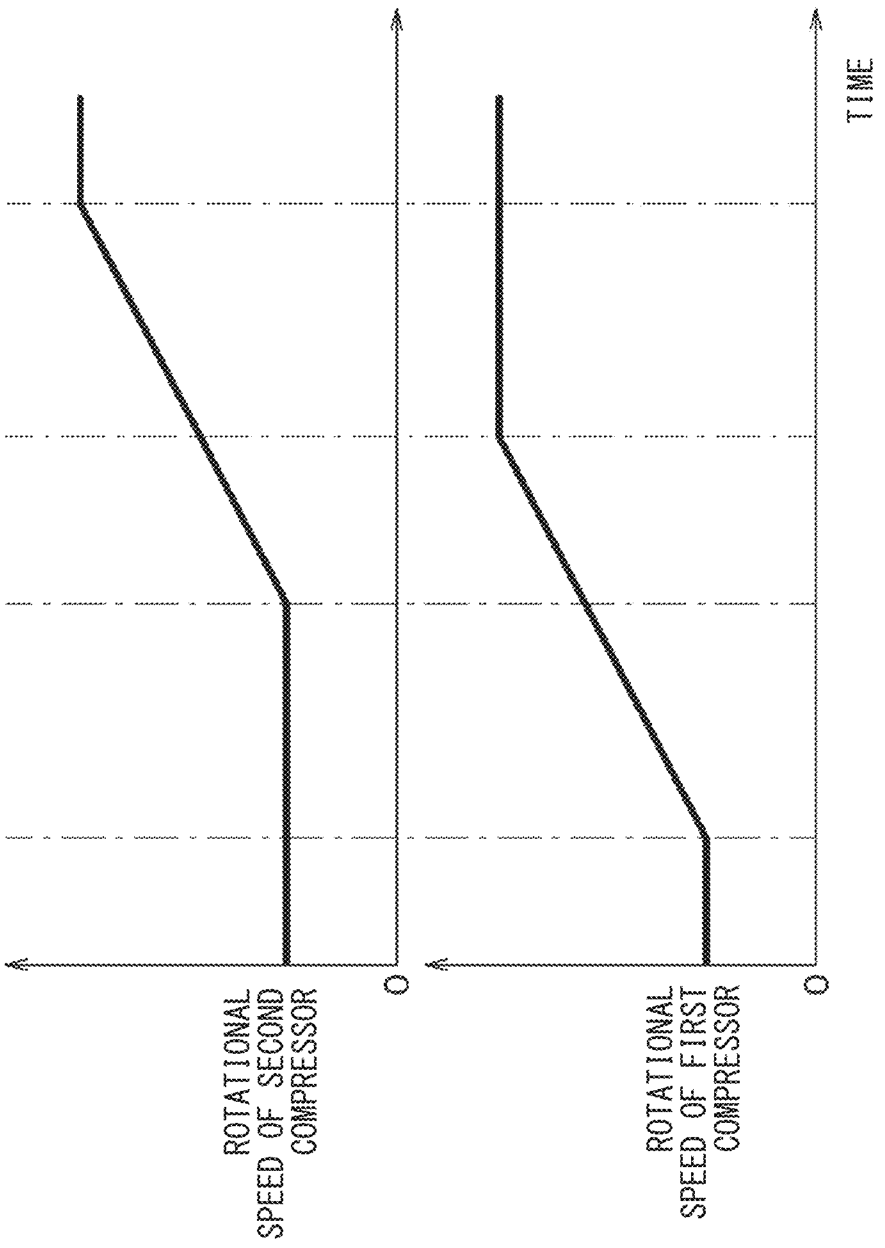
FIG. 13 is a time chart showing a case where the rotational speed of each of the first and second compressors is increased in a first rotational speed increasing pattern for increasing the rotational speed of the first compressor earlier than the rotational speed of the second compressor in the first embodiment.

(8) According to the present embodiment, as illustrated in FIGS. 12 to 14, the circuit controller 80*a* controls the first and second compressors 101, 201 as follows when the rotational speeds of both the first and second compressors 101, 201 are to be increased during the operation of both the first and second compressors 101, 201. That is, in this case, the circuit controller 80*a* increases one of the rotational speed of the first compressor 101 or the rotational speed of the second compressor 201 earlier than the other.

With such rotational speed control, it is possible to suppress deterioration in noise or vibration that may occur due to the operation of the first and second compressors 101, 201, for example, deterioration in noise or vibration that may occur due to the rotational speed of the first compressor 101 being close to the rotational speed of the second compressor 201.

As illustrated in FIG. 15, the enthalpy difference between a saturated liquid line SL and a saturated vapor line SG of the first and second refrigerants increases toward the lower-pressure side. When the first and second refrigeration cycles 10, 20 are both in operation as in the coordinated heating mode, for example, the first refrigeration cycle 10 that absorbs heat from outside air is operated at a lower pressure than the second refrigeration cycle 20. For this reason, the enthalpy difference of the first refrigeration cycle 10 is larger than the enthalpy difference of the second refrigeration cycle 20 in both cases where the heat radiation sides of the first and second refrigeration cycles 10, 20 are compared with each other and the case where the heat absorption sides thereof are compared with each other. Accordingly, when the efficiency at which the refrigerant transfers heat from the heat absorption side to the heat radiation side of the refrigeration cycle is compared between the first refrigeration cycle 10 and the second refrigeration cycle 20, the efficiency is better in the first refrigeration cycle 10 than in the second refrigeration cycle 20.

Therefore, for example, in the coordinated heating mode, if the rotational speed of the first compressor 101 is increased earlier than the rotational speed of the second compressor 201, the heating efficiency can be improved compared to the case where the rotational speed of the second compressor 201 is increased earlier than the rotational speed of the first compressor 101.

On the other hand, in the coordinated heating mode, the temperature rise of the second refrigerant in the second radiator 202 is more quickly reflected in the temperature of the first heat medium flowing through the heater core 35 than the temperature rise of the first refrigerant in the first radiator 102. Therefore, in the coordinated heating mode, if the rotational speed of the second compressor 201 is increased earlier than the rotational speed of the first compressor 101, the heating performance can be improved compared to the case where the rotational speed of the first compressor 101 is increased earlier than the rotational speed of the second compressor 201.

(9) According to the present embodiment, as illustrated in FIGS. 12 to 14, the circuit controller 80*a* controls the first and second compressors 101, 201 as follows when the rotational speeds of both the first and second compressors 101, 201 are to be increased during the operation of both the first and second compressors 101, 201. That is, in this case, the circuit controller 80*a* selects one of a first rotational speed increasing pattern, in which the rotational speed of the first compressor 101 is increased earlier than the rotational speed of the second compressor 201, and a second rotational speed increasing pattern, in which the rotational speed of the second compressor 201 is increased earlier than the rotational speed of the first compressor 101. The circuit controller 80*a* increases the rotational speed of each of the first compressor 101 and the second compressor 201 in the selected rotational speed increasing pattern.

Therefore, it is possible to appropriately improve the efficiency of the first and second refrigeration cycles 10, 20 according to the situation while suppressing deterioration in noise or vibration that may occur due to the operation of the first compressor 101 and the second compressor 201.

(10) According to the present embodiment, when the rotational speeds of both the first and second compressors 101, 201 are to be increased in the equipment-cooling cooling mode, the circuit controller 80*a* selects the first rotational speed increasing pattern if the load on the first compressor 101 is larger than the load on the second compressor 201. On the other hand, the circuit controller 80*a* selects the second rotational speed increasing pattern if the load on the second compressor 201 is larger than the load on the first compressor 101.

When selecting the first rotational speed increasing pattern, the circuit controller 80*a* increases the rotational speed of the first compressor 101 earlier than the rotational speed of the second compressor 201. Conversely, when selecting the second rotational speed increasing pattern, the circuit controller 80*a* increases the rotational speed of the second compressor 201 earlier than the rotational speed of the first compressor 101.

Therefore, it is possible to quickly respond to performance improvement on the side to be prioritized between cooling performance improvement and battery cooling performance improvement, while suppressing deterioration in noise or vibration that may occur due to the operation of the first compressor 101 and the second compressor 201.

(11) According to the present embodiment, when the rotational speeds of both the first and second compressors 101, 201 are to be increased during the dehumidification and heating of the vehicle interior space 68, the circuit controller 80*a* increases the rotational speed of the second compressor 201 earlier than the rotational speed of the first compressor 101.

Therefore, it is possible to rapidly increase the temperature of the ventilation air compared to, for example, a case where the rotational speed of the first compressor 101 is increased earlier than the rotational speed of the second compressor 201. It is thus possible to improve the comfort of the occupant. It is possible to suppress deterioration in noise or vibration that may occur due to the operation of the first compressor 101 and the second compressor 201.

(12) According to the present embodiment, as illustrated in FIGS. 4 and 5, in the coordinated heating mode and the single heating mode, the second radiator 202 radiates heat from the second refrigerant in the second radiator 202 to the ventilation air blown into the vehicle interior space 68 via the first heat medium in the second circulation path 72. Therefore, the second refrigeration cycle 20 including the second radiator 202 can be used for heating the vehicle interior space 68.

(13) According to the present embodiment, as illustrated in FIG. 1, the first radiator 102 includes the condensing portion 103 and the subcooling portion 104. The condensing portion 103 condenses the first refrigerant by radiating heat from the first refrigerant discharged from the first compressor 101, and the subcooling portion 104 subcools the first refrigerant by further radiating heat from the first refrigerant condensed by the condensing portion 103.

Therefore, compared to the configuration in which the first radiator 102 does not include the subcooling portion 104, the amount of heat radiated from the first refrigeration cycle 10 increases, whereby the low-pressure side of the second refrigeration cycle 20 can be raised, for example, in the coordinated heating mode. As a result, heating efficiency and heating performance can be improved.

Second Embodiment

Hereinafter, a second embodiment will be described. In the present embodiment, differences from the first embodiment described above will be mainly described. In addition, the same or equivalent parts as those in the embodiment described above will be omitted or simplified. The same applies to the description of the embodiment below.

In the present embodiment, the compressor capacity of the first compressor 101 is larger than the compressor capacity of the second compressor 201. Thus, when both the first and second compressors 101, 201 are in operation, for example, in the coordinated heating mode or the equipment-cooling cooling mode, the discharge flow rate of the first compressor 101 is larger than the discharge flow rate of the second compressor 201.

For example, the refrigeration cycle device 9 can be configured to place more importance on heating efficiency rather than maximum heating performance in the coordinated heating mode. This is for the same reason as described above with reference to FIG. 15 that increasing the rotational speed of the first compressor 101 earlier than the rotational speed of the second compressor 201 leads to improvement in heating efficiency.

As illustrated in FIGS. 4 to 6, the ability of the first refrigeration cycle 10 to absorb heat or radiate heat is more likely to affect the cooling performance than the ability of the second refrigeration cycle 20 to absorb heat or radiate heat. On the other hand, the ability of the second refrigeration cycle 20 to absorb heat or radiate heat is more likely to affect the heating performance than the ability of the first refrigeration cycle 10 to absorb heat or radiate heat. Thus, by setting the compressor capacities and the discharge flow rates of the first and second compressors 101, 201 of the present embodiment as described above, the refrigeration cycle device 9 can place more importance on the maximum cooling performance than the maximum heating performance.

When variable displacement compressors are adopted as the first and second compressors 101, 201 of the present embodiment, the maximum compressor capacity of the first compressor 101 is larger than the maximum compressor capacity of the second compressor 201.

The present embodiment is similar to the first embodiment except for the above description. In the present embodiment, similar effects to those of the first embodiment can be obtained from the configuration common to the first embodiment described above.

Third Embodiment

Next, a third embodiment will be described. In the present embodiment, differences from the first embodiment described above will be mainly described.

In the present embodiment, the compressor capacity of the second compressor 201 is larger than the compressor capacity of the first compressor 101. Thus, when both the first and second compressors 101, 201 are in operation, for example, in the coordinated heating mode or the equipment-cooling cooling mode, the discharge flow rate of the second compressor 201 is larger than the discharge flow rate of the first compressor 101.

Therefore, for example, the refrigeration cycle device 9 can be configured to place more importance on maximum heating performance rather than heating efficiency in the coordinated heating mode. This is for the same reason as described above with reference to FIG. 15 that increasing the rotational speed of the second compressor 201 earlier than the rotational speed of the first compressor 101 leads to improvement in heating performance.

When variable displacement compressors are adopted as the first and second compressors 101, 201 of the present embodiment, the maximum compressor capacity of the second compressor 201 is larger than the maximum compressor capacity of the first compressor 101.

From the present embodiment and the second embodiment described above, it can be said that by differentiating between the compressor capacity of the first compressor 101 and the compressor capacity of the second compressor 201, it is possible to meet a wide range of needs.

The present embodiment is similar to the first embodiment except for the above description. In the present embodiment, similar effects to those of the first embodiment can be obtained from the configuration common to the first embodiment described above.

Other Embodiments (1) In each of the embodiments described above, the air-conditioning expansion valve 106 and the first expansion valve 108 illustrated in FIG. 1 can be fully closed, but this is an example. For example, the air-conditioning expansion valve 106 cannot be fully closed, and an opening/closing valve may be provided at the refrigerant inlet 106*a* of the air-conditioning expansion valve 106. Similarly, the first expansion valve 108 cannot be fully closed, and an opening/closing valve may be provided at the refrigerant inlet 108*a* of the first expansion valve 108. In this case, the two opening/closing valves function as a refrigerant flow path switching portion that switches the flow path for the first refrigerant.

(2) In each of the above embodiments, the refrigeration cycle device 9 is configured to execute, as its operation modes, a coordinated heating mode, a single heating mode, a cooling mode, an equipment-cooling mode, an equipment-warming heating mode, an equipment-warming mode, an equipment-cooling heating mode, a first dehumidification and heating mode, and a second dehumidification and heating mode. However, this is an example, and not all of these operation modes are essential. The refrigeration cycle device 9 may be configured to execute an operation mode different from these operation modes.

(3) In each of the embodiments described above, as the first and second compressors 101, 201, for example, those driven by an internal combustion engine may be adopted instead of an electric compressor. The first radiator 102 may be configured such that the subcooling portion 104 is omitted and only the condensing portion 103 is provided. Each of the expansion valves 106, 108, 203 may not be an electric expansion valve but may be, for example, a mechanical expansion valve or a fixed throttle. The second heat medium circuit 50 may not be provided, and the first evaporator 109 may be a heat exchanger that exchanges heat between the first refrigerant in the first evaporator 109 and the outside air, without interposing the second heat medium of the second heat medium circuit 50.

(4) In each of the above embodiments, the same refrigerant as the first refrigerant in the first refrigeration cycle 10 is adopted as the second refrigerant in the second refrigeration cycle 20, but a refrigerant different from the first refrigerant may be adopted.

(5) In each of the embodiments described above, the first and second heating media are, for example, liquids, but this is an example. For example, either one or both of the first and second heating media may be gas. Furthermore, the first and second heat medium circuits 30, 50 transfer heat with the first and second heating media that are fluids. However, the first and second heat medium circuits may each be configured to transfer heat using a solid with high thermal conductivity, such as metal, instead of fluid.

(6) In each of the embodiments described above, as illustrated in FIG. 1, the in-vehicle target equipment cooled or warmed by the refrigeration cycle device 9 is the battery 69, but the in-vehicle target equipment is not limited to the battery 69. As the in-vehicle target equipment, for example, an electric motor, an inverter that converts a frequency of electric power supplied to the electric motor, a charger for charging the battery 69, or the like is assumed in addition to the battery 69.

(7) In each of the embodiments described above, the air conditioner 8 is installed in, for example, an electric vehicle or a hybrid vehicle, but this is an example. For example, the air conditioner 8 may be used in a stationary device or system instead of a moving object such as a vehicle.

(8) In the embodiments described above, as illustrated in FIG. 3, the circuit controller **80*a* is included in the control device 80 that controls each piece of equipment of the air conditioner 8, but this is an example. For example, in the control device 80, a controller other than the circuit controller 80*a* and the circuit controller 80*a*** may be configured as separate control devices.

(9) In the embodiments described above, when the rotational speeds of both the first and second compressors 101, 201 are to be increased in the coordinated heating mode, the circuit controller **80*a* switches to one of the first and second compressors 101, 201, the rotational speed of which is increased earlier, according to the operation of the occupant. However, this is an example. For example, the circuit controller 80*a* may automatically switch one of the first and second compressors 101, 201, the rotational speed of which is increased earlier, based on detection signals and the like input from a plurality of sensors to the control device 80** regardless of the operation of the occupant.

(10) The present disclosure is not limited to each of the embodiments described above, and various modifications can be made. It is understood that in each of the above embodiments, the elements constituting the embodiments are not necessarily essential except for a case where it is explicitly stated that the elements are particularly essential and a case where the elements are considered to be obviously essential in principle.

In each of the above embodiments, when a numerical value such as the number, a numerical value, an amount, or a range of the components of the embodiment is mentioned, the numerical value is not limited to a specific number unless otherwise specified as being essential or obviously limited to the specific number in principle. In each of the above embodiments, when the materials, shapes, positional relationships, and the like of the components and the like are referred to, the materials, shapes, positional relationships, and the like are not limited thereto unless otherwise specified or limited to specific materials, shapes, positional relationships, and the like in principle.

In addition, in each of the embodiments described above, when it is described that external environmental information (e.g., the temperature of the outside air, etc.) of the vehicle is acquired from a sensor, it is also possible to receive the external environmental information from a server or a cloud outside the vehicle without using the sensor. Alternatively, it is also possible to eliminate the sensor, acquire relevant information related to the external environmental information from a server or a cloud outside the vehicle, and estimate the external environmental information from the acquired related information.

The control device 80 and the technique according to the present disclosure may be achieved by a dedicated computer provided by constituting a processor and a memory programmed to execute one or more functions embodied by a computer program. The control device 80 and the technique according to the present disclosure may be achieved by a dedicated computer provided by constituting a processor with one or more dedicated hardware logic circuits. Alternatively, the control device 80 and the technique according to the present disclosure may be achieved using one or more dedicated computers formed of a combination of the processor and the memory programmed to execute one or more functions and the processor including one or more hardware logic circuits. The computer program may be stored in a computer-readable non-transitional tangible recording medium as an instruction to be executed by the computer.

What is claimed is:

1. A refrigeration cycle device configured to perform air conditioning for a space to be air conditioned, the refrigeration cycle device comprising:

a first refrigeration cycle which includes a first compressor, a first radiator, an air-conditioning expansion valve, an air-conditioning evaporator, a first expansion valve, and a first evaporator, and in which a first refrigerant circulates while evaporating in at least one of the air-conditioning evaporator or the first evaporator and radiating heat in the first radiator;

a second refrigeration cycle which includes a second compressor, a second radiator, a second expansion valve, and a second evaporator, and in which a second refrigerant circulates while evaporating in the second evaporator and radiating heat in the second radiator;

a heat transfer portion configured to switch a heat radiation destination from the first radiator between the second refrigerant in the second evaporator and outside air, and a controller configured to control the first refrigeration cycle, the second refrigeration cycle, and the heat transfer portion, wherein the air-conditioning evaporator is configured to cause the first refrigerant to absorb heat from ventilation air to be blown into the space as the first refrigerant evaporates, the first evaporator is configured to cause the first refrigerant to absorb heat from outside air as the first refrigerant evaporates, the second radiator is configured to radiate heat from the second refrigerant in the second radiator to the ventilation air, the heat transfer portion is made of a heat medium circuit in which a heat medium circulates, the heat medium circuit includes an outside air heat exchanger that exchanges heat between the heat medium and outside air, and a heating heat exchanger that exchanges heat between the heat medium and the ventilation air to heat the ventilation air, the first radiator is configured to radiate heat from the first refrigerant to the heat medium, the second evaporator is configured to evaporate the second refrigerant by causing the second refrigerant to absorb heat from the heat medium, the second radiator is a heat exchanger that causes the second refrigerant to radiate heat to the heat medium, and causes the second refrigerant to radiate heat to the ventilation air via the heat medium when the second refrigerant is made to radiate heat to the ventilation air, in a heating operation in which the space to be air conditioned is heated, the controller is configured (i) to set, in the heat medium circuit, a first circulation path through which the heat medium flows between the first radiator and the second evaporator, and a second circulation path in which the heat medium is prevented from flowing through the first circulation path and through which the heat medium flows between the second radiator and the heating heat exchanger, (ii) to cause the heat medium to circulate through the first circulation path and the second circulation path, (iii) to cause the first compressor and the second compressor to operate, and (iv) to allow the first refrigerant to flow from the first radiator to the first expansion valve and the first evaporator in the first refrigeration cycle, and in a cooling operation in which the space to be air conditioned is cooled, the controller is configured (i) to set, in the heat medium circuit, a third circulation path in which the heat medium is prevented from flowing through the heating heat exchanger and through which the heat medium flows between the first radiator and the outside air heat exchanger, (ii) to cause the heat medium to circulate through the third circulation path, (iii) to cause the first compressor to operate, and (iv) to allow the first refrigerant to flow from the first radiator to the air-conditioning expansion valve and the air-conditioning evaporator in the first refrigeration cycle.

2. The refrigeration cycle device according to claim 1, wherein the heat medium circuit includes an equipment heat exchanger in which an in-vehicle target equipment and the heat medium are heat-exchanged, the third circulation path is a circulation path through which the heat medium flows to the first radiator, the second radiator, and the outside air heat exchanger, and when the target equipment is cooled during a non-heating of the space to be air conditioned, the controller is configured to set, in the heat medium circuit, the third circulation path and a fourth circulation path in which the heat medium is prevented from flowing through the third circulation path and through which the heat medium flows between the second evaporator and the equipment heat exchanger, the controller causing the heat medium to circulate through each of the third circulation path and the fourth circulation path and causing the second compressor to operate.

3. The refrigeration cycle device according to claim 2, wherein the first circulation path is a circulation path through which the heat medium flows to the first radiator, the equipment heat exchanger, and the second evaporator, and when the target equipment is warmed, the controller is configured to set the first circulation path in the heat medium circuit, to cause the heat medium to circulate through the first circulation path, to cause the first compressor to operate, and to allow the first refrigerant to flow from the first radiator to the first expansion valve and the first evaporator in the first refrigeration cycle.

4. The refrigeration cycle device according to claim 2, wherein the first circulation path is a circulation path through which the heat medium flows to the first radiator, the equipment heat exchanger, and the second evaporator, and when the target equipment is warmed during a heating operation of the space to be air conditioned, the controller is configured to set the first circulation path and the second circulation path in the heat medium circuit, to cause the heat medium to circulate through each of the first circulation path and the second circulation path, to cause the first compressor and the second compressor to operate, and to allow the first refrigerant to flow from the first radiator to the first expansion valve and the first evaporator in the first refrigeration cycle.

5. The refrigeration cycle device according to claim 2, wherein when the target equipment is cooled during a heating operation of the space to be air conditioned, the controller is configured to set the second circulation path and the fourth circulation path in the heat medium circuit, to circulate the heat medium in each of the second circulation path and the fourth circulation path, and to cause the second compressor to operate.

6. The refrigeration cycle device according to claim 1, wherein the heat medium circuit is configured to set an outside-air heat absorption circulation path in which the heat medium is prevented from flowing to the second circulation path, and the heat medium circulates between the second evaporator and the outside air heat exchanger, when a heating operation of the space to be air conditioned is performed, the controller is configured to set one of the first circulation path or the outside-air heat absorption circulation path in the heat medium circuit, and to set the second circulation path in the heat medium circuit, when the first circulation path is set in a case where the heating operation of the space to be air conditioned is performed, the controller is configured to cause the heat medium to circulate through each of the first circulation path and the second circulation path, to cause the first compressor and the second compressor to operate, and to allow the first refrigerant to flow from the first radiator to the first expansion valve and the first evaporator in the first refrigeration cycle, and when the outside-air heat absorption circulation path is set in a case where the heating operation of the space to be air conditioned is performed, the controller is configured to cause the heat medium to circulate through the outside-air heat absorption circulation path and the second circulation path, and to cause the second compressor to operate.

7. The refrigeration cycle device according to claim 1, wherein the heating heat exchanger is disposed to heat the ventilation air flowing out of the air-conditioning evaporator, and in a dehumidifying and heating operation in which the ventilation air is dehumidified and heated, the controller is configured to set the first circulation path and the second circulation path in the heat medium circuit, to cause the heat medium to circulate through each of the first circulation path and the second circulation path, to cause the first compressor and the second compressor to operate, and to allow the first refrigerant to flow from the first radiator to the air-conditioning expansion valve and the air-conditioning evaporator in the first refrigeration cycle.

8. The refrigeration cycle device according to claim 1, wherein when both a rotational speed of the first compressor and a rotational speed of the second compressor are to be increased during operation of both the first compressor and the second compressor, the controller increases one of the rotational speed of the first compressor or the rotational speed of the second compressor earlier than the other.

9. The refrigeration cycle device according to claim 1, wherein, when both a rotational speed of the first compressor and a rotational speed of the second compressor are to be increased during operation of both the first compressor and the second compressor, the controller selects one of a first rotational speed increasing pattern, in which the rotational speed of the first compressor is increased earlier than the rotational speed of the second compressor, or a second rotational speed increasing pattern, in which the rotational speed of the second compressor is increased earlier than the rotational speed of the first compressor, and increases the rotational speed of each of the first compressor and the second compressor in the selected rotational speed increasing pattern.

10. The refrigeration cycle device according to claim 2, wherein when both a rotational speed of the first compressor and a rotational speed of the second compressor are to be increased in a case where the third circulation path and the fourth circulation path are set and the first compressor and the second compressor are operated to allow the first refrigerant to flow from the first radiator to the air-conditioning expansion valve and the air-conditioning evaporator in the first refrigeration cycle, the controller increases the rotational speed of the first compressor earlier than the rotational speed of the second compressor when a load on the first compressor is larger than a load on the second compressor, and increases the rotational speed of the second compressor earlier than the rotational speed of the first compressor when the load on the second compressor is larger than the load on the first compressor.

11. The refrigeration cycle device according to claim 7, wherein the controller increases the rotational speed of the second compressor earlier than the rotational speed of the first compressor when both the rotational speed of the first compressor and the rotational speed of the second compressor are to be increased during the dehumidification and heating operation.

12. The refrigeration cycle device according to claim 1, wherein the first radiator includes a condensing portion that condenses the first refrigerant by radiating heat from the first refrigerant discharged from the first compressor, and a subcooling portion that subcools the first refrigerant by further radiating heat from the first refrigerant condensed in the condensing portion.

13. The refrigeration cycle device according to claim 1, wherein one of a capacity of the first compressor or a capacity of the second compressor is larger than an another one thereof.

14. The refrigeration cycle device according to claim 1, wherein one of a discharge flow rate of the first compressor or a discharge flow rate of the second compressor is larger than an another one thereof.

15. A refrigeration cycle device comprising:

a first refrigeration cycle which includes a first compressor, a first radiator, a first expansion valve, and a first evaporator, and in which a first refrigerant circulates while evaporating in the first evaporator and radiating heat in the first radiator;

a second refrigeration cycle which includes a second compressor, a second radiator, a second expansion valve, and a second evaporator, and in which a second refrigerant circulates while evaporating in the second evaporator and radiating heat in the second radiator; and a heat transfer portion configured to transfer heat released from the first refrigerant in the first radiator to the second refrigerant in the second evaporator, wherein the first evaporator is configured to cause the first refrigerant to absorb heat from outside air as the first refrigerant evaporates, wherein the heat transfer portion is made of a heat medium circuit in which a heat medium circulates, the heat medium circuit includes an outside air heat exchanger that exchanges heat between the heat medium and outside air, and a heating heat exchanger that exchanges heat between the heat medium and the ventilation air to heat the ventilation air, the first radiator is configured to radiate heat from the first refrigerant to the heat medium, the second evaporator is configured to evaporate the second refrigerant by causing the second refrigerant to absorb heat from the heat medium, the second radiator is a heat exchanger that causes the second refrigerant to radiate heat to the heat medium, and causes the second refrigerant to radiate heat to the ventilation air via the heat medium when the second refrigerant is made to radiate heat to the ventilation air, in a heating operation in which the space to be air conditioned is heated, a controller is configured (i) to set, in the heat medium circuit, a first circulation path through which the heat medium flows between the first radiator and the second evaporator, and a second circulation path in which the heat medium is prevented from flowing through the first circulation path and through which the heat medium flows between the second radiator and the heating heat exchanger, (ii) to cause the heat medium to circulate through the first circulation path and the second circulation path, (iii) to cause the first compressor and the second compressor to operate, and (iv) to allow the first refrigerant to flow from the first radiator to the first expansion valve and the first evaporator in the first refrigeration cycle, and in a cooling operation in which the space to be air conditioned is cooled, the controller is configured (i) to set, in the heat medium circuit, a third circulation path in which the heat medium is prevented from flowing through the heating heat exchanger and through which the heat medium flows between the first radiator and the outside air heat exchanger, (ii) to cause the heat medium to circulate through the third circulation path, (iii) to cause the first compressor to operate, and (iv) to allow the first refrigerant to flow from the first radiator to the air-conditioning expansion valve and the air-conditioning evaporator in the first refrigeration cycle.

16. The refrigeration cycle device according to claim 15, wherein the second radiator causes the second refrigerant in the second radiator to radiate heat to ventilation air blown into the space to be air conditioned.

* * * * *